United States Patent
Jones et al.

(10) Patent No.: US 8,280,921 B2
(45) Date of Patent: Oct. 2, 2012

(54) ANONYMOUS SEARCH SYSTEM USING HUMAN SEARCHERS

(75) Inventors: Scott A. Jones, Carmel, IN (US); Thomas E. Cooper, Carmel, IN (US)

(73) Assignee: ChaCha Search, Inc., Carmel, IN (US)

( * ) Notice: Subject to any disclaimer, the term of this patent is extended or adjusted under 35 U.S.C. 154(b) by 0 days.

(21) Appl. No.: 11/779,502

(22) Filed: Jul. 18, 2007

(65) Prior Publication Data
US 2008/0021884 A1 Jan. 24, 2008

Related U.S. Application Data

(60) Provisional application No. 60/807,679, filed on Jul. 18, 2006.

(51) Int. Cl.
*G06F 17/30* (2006.01)

(52) U.S. Cl. .................................................. 707/805

(58) Field of Classification Search .................. None
See application file for complete search history.

(56) References Cited

U.S. PATENT DOCUMENTS

| | | | |
|---|---|---|---|
| 5,559,940 A | 9/1996 | Hutson | |
| 5,732,259 A | 3/1998 | Konno | |
| 5,862,223 A | 1/1999 | Walker et al. | |
| 5,875,231 A | 2/1999 | Farfan et al. | |
| 5,884,272 A * | 3/1999 | Walker et al. | 705/1 |
| 5,915,010 A | 6/1999 | McCalmont | |
| 5,948,054 A | 9/1999 | Nielsen | |
| 6,073,140 A * | 6/2000 | Morgan et al. | 707/203 |
| 6,128,380 A | 10/2000 | Shaffer et al. | |
| 6,223,165 B1 | 4/2001 | Lauffer | |
| 6,377,944 B1 * | 4/2002 | Busey et al. | 1/1 |
| 6,381,640 B1 | 4/2002 | Beck et al. | |

(Continued)

FOREIGN PATENT DOCUMENTS
EP 0 982 915 3/2000
(Continued)

OTHER PUBLICATIONS

U.S. Appl. No. 11/336,928, filed Jan. 23, 2006, Scott A. Jones, Chacha Search, Inc.

(Continued)

*Primary Examiner* — Bai D. Vu

(57) ABSTRACT

A system and a method are disclosed for performing a search with the assistance of a computer. The system may assign a unique identifier to a user, to a query submitted to the system by the user, to a human searcher that may respond to the query, and to a result produced by a human searcher in response to the query. These unique identifiers may be stored in a database, and associated with one another. The system may receive a query from the user during a first communication session, and present the query to the searcher to perform a search responsive to the query. The searcher may produce search results and transmit the results to the system during the first communication session. The system may receive the search results from the searcher during the first communication session, and forward the results to the user. Because the system maintains a database of unique identifiers for each original query associated with the unique identifier of the posing user and responding searcher, the system may establish an anonymous communication channel between the user and the searcher during the initial session when the query is posed and answered, and also during follow-up sessions that may occur in the future.

32 Claims, 24 Drawing Sheets

U.S. PATENT DOCUMENTS

| | | | |
|---|---|---|---|
| 6,393,423 B1* | 5/2002 | Goedken | 707/10 |
| 6,430,602 B1 | 8/2002 | Kay et al. | |
| 6,505,166 B1* | 1/2003 | Stephanou | 705/7.14 |
| 6,507,841 B2 | 1/2003 | Riverieulx de Varax | |
| 6,513,013 B1 | 1/2003 | Stephanou | |
| 6,523,010 B2 | 2/2003 | Lauffer | |
| 6,578,010 B1 | 6/2003 | Teacherson | |
| 6,675,159 B1 | 1/2004 | Lin et al. | |
| 6,691,159 B1 | 2/2004 | Grewal et al. | |
| 6,745,195 B1* | 6/2004 | Kornfein et al. | 707/102 |
| 6,829,585 B1 | 12/2004 | Grewal et al. | |
| 6,895,406 B2 | 5/2005 | Fables et al. | |
| 6,901,394 B2 | 5/2005 | Chauhan et al. | |
| 6,914,975 B2 | 7/2005 | Koehler et al. | |
| 6,973,482 B2 | 12/2005 | Mohammed et al. | |
| 6,985,943 B2 | 1/2006 | Deryugin et al. | |
| 6,990,189 B2 | 1/2006 | Ljubicich | |
| 6,993,555 B2 | 1/2006 | Kay et al. | |
| 7,000,019 B2 | 2/2006 | Low et al. | |
| 7,027,993 B1 | 4/2006 | Verdi et al. | |
| 7,027,994 B2 | 4/2006 | Verdi et al. | |
| 7,039,681 B2 | 5/2006 | Nolte et al. | |
| 7,085,806 B1 | 8/2006 | Shapira | |
| 7,318,057 B2* | 1/2008 | Aridor et al. | 707/3 |
| 2001/0034015 A1 | 10/2001 | Raichur et al. | |
| 2002/0029272 A1 | 3/2002 | Weller | |
| 2002/0059395 A1 | 5/2002 | Liou | |
| 2002/0133494 A1 | 9/2002 | Goedken | |
| 2002/0140715 A1 | 10/2002 | Smet | |
| 2002/0167539 A1 | 11/2002 | Brown et al. | |
| 2002/0194049 A1 | 12/2002 | Boyd | |
| 2003/0070176 A1 | 4/2003 | Parker et al. | |
| 2003/0140037 A1 | 7/2003 | Deh-Lee | |
| 2003/0144895 A1 | 7/2003 | Aksu et al. | |
| 2003/0145001 A1 | 7/2003 | Craig et al. | |
| 2003/0174818 A1 | 9/2003 | Hazenfield | |
| 2003/0191689 A1 | 10/2003 | Bosarge et al. | |
| 2003/0198325 A1 | 10/2003 | Bayne | |
| 2003/0204501 A1 | 10/2003 | Moon | |
| 2003/0220919 A1 | 11/2003 | Tsitas | |
| 2004/0023644 A1 | 2/2004 | Montemer | |
| 2004/0024752 A1 | 2/2004 | Manber et al. | |
| 2004/0049541 A1 | 3/2004 | Swahn | |
| 2004/0139156 A1 | 7/2004 | Matthews et al. | |
| 2004/0153505 A1 | 8/2004 | Verdi et al. | |
| 2004/0203634 A1 | 10/2004 | Wang et al. | |
| 2005/0015506 A1 | 1/2005 | Padborg | |
| 2005/0060217 A1 | 3/2005 | Douglas et al. | |
| 2005/0086290 A1 | 4/2005 | Joyce et al. | |
| 2005/0105712 A1 | 5/2005 | Williams et al. | |
| 2005/0131866 A1 | 6/2005 | Badros | |
| 2005/0136949 A1 | 6/2005 | Barnes, Jr. | |
| 2005/0210042 A1* | 9/2005 | Goedken | 707/100 |
| 2005/0289124 A1 | 12/2005 | Kaiser et al. | |
| 2006/0004713 A1 | 1/2006 | Korte et al. | |
| 2006/0010105 A1 | 1/2006 | Sarukkai et al. | |
| 2006/0041550 A1 | 2/2006 | Bennett et al. | |
| 2006/0041562 A1 | 2/2006 | Paczkowski et al. | |
| 2006/0064404 A1 | 3/2006 | Kishore et al. | |
| 2006/0074863 A1 | 4/2006 | Kishore et al. | |
| 2006/0167941 A1* | 7/2006 | Huang et al. | 707/104.1 |
| 2007/0005344 A1 | 1/2007 | Sandor et al. | |
| 2007/0005698 A1 | 1/2007 | Kumar et al. | |
| 2007/0088794 A1* | 4/2007 | Akins et al. | 709/217 |
| 2007/0260587 A1* | 11/2007 | Mohan | 707/3 |
| 2011/0125760 A1* | 5/2011 | Frieden et al. | 707/748 |

FOREIGN PATENT DOCUMENTS

| | | |
|---|---|---|
| JP | 2000-242579 | 9/2000 |
| JP | 2004-46670 | 2/2004 |
| WO | WO 01/09771 | 2/2001 |
| WO | WO 01/50729 | 7/2001 |
| WO | WO 01/75683 | 10/2001 |
| WO | WO 01/86928 | 11/2001 |
| WO | WO 02/45335 | 6/2002 |
| WO | WO 2004/057473 | 7/2004 |
| WO | WO 2005/048078 | 5/2005 |
| WO | WO 2006/026579 | 3/2006 |

OTHER PUBLICATIONS

U.S. Appl. No. 11/469,732, filed Jul. 10, 2006, Scott A. Jones et al., Chacha Search Inc.

International Search Report issued Jan. 28, 2008 in PCT/US07/75369.

International Search Report issued Feb. 12, 2008 in PCT/US07/60467.

International Search Report issued Feb. 27, 2008 in PCT/US07/60459.

International Search Report issued Feb. 15, 2008 in PCT/US07/60468.

International Search Report issued Feb. 7, 2008 in PCT/US07/60472.

Carmel et al., "Searching XML Documents via XML Fragments," 2003, ACM, pp. 151-158.

Karat et al., "Patterns of Entry and Correction in Large Vocabulary Continuous Speech Recognition Systems," 1999, ACM, pp. 568-575.

Google Tutor, "Googling from your Mobile Phone—no Web Browser Needed!," 2005, Google Tour.

Varshney et al., "Voice Over IP," 2002, Communications of the ACM, vol. 45, No. 1, pp. 89-96.

Knoblock, Craig A., "Searching the World Wide Web," 1997, IEEE Expert, pp. 8-14.

Sullivan, Danny, "Google Launches Personalized Home Page," Search Engine Watch, May 2005.

* cited by examiner

ANONYMOUS SEARCH SYSTEM USING HUMAN SEARCHERS

CROSS-REFERENCE TO RELATED APPLICATIONS

This application is related to and claims the benefit of U.S. provisional patent application Ser. No. 60/807,679, titled ANONYMOUS SEARCH SYSTEM USING HUMAN SEARCHERS, inventor Scott A. Jones, et al., filed Jul. 18, 2006, in the United States Patent and Trademark Office, the disclosure of which is incorporated herein by reference.

BACKGROUND

1. Field

The disclosed system and method utilizing human searchers to perform searches for users in real-time. The user and searcher may communicate anonymously during the search process, and may reestablish anonymous communications after the completion of the search.

2. Description of the Related Art

In the current search environment a user can access a search engine, such as Google® and perform a search. However, many users struggle with formulating a set of keywords that will result in the search engine obtaining useful results. (The term "keyword" includes one or more keywords and/or keyphrases that can include multiple keywords as well as natural language sentences that can be analyzed to extract keywords and keyphrases). Also, while there are already more web pages indexed than the world's population, it is estimated that less than 1% of all information is indexed by any given search engine.

Attempts have been made to have humans answer users' questions via a variety of mechanisms. One limitation of such systems is that it may be difficult for the searcher and/or the user to remain completely anonymous with respect to one another during communications following an initial session. "Anonymity" and "anonymous" as used herein refer to communications in which neither party knows the other party's e-mail address, instant messaging username, telephone number, or the like, such that neither party could contact the other party "directly" (outside of the search system).

One method for maintaining the anonymity of a user and a responder during a single exchange is addressed U.S. Pat. No. 6,393,423 titled "Apparatus and Methods for Electronic Information Exchange", issued to Goedken. This patent discusses a method for facilitating information exchange between an information requestor and a responder where the parties communicate via e-mail. In the method disclosed by Goedken, a Message ID is generated for each request, and a database entry is created that maps the Message ID to the request and the user's e-mail address. A computer generates a second e-mail containing the request and the Message ID (but not the user's address) and sends it to the responder. The responder responds with a third e-mail that includes an answer and the Message ID. The computer receives the third e-mail, associates the response with the Message ID, and generates a fourth e-mail including the response and the Message ID (but not the responder's address) and sends it to the user.

The method disclosed by Goedken, however, does not disclose how the user may ask the responder a follow-up question, or a new question. Because the disclosed system allows for a large number of responders to respond to requests, it would be difficult for the user to reestablish communications with the same responder. Likewise, because the responder does not know the identity of a user, it may be difficult for the responder to update the user if, for example, the answer changes based on additional knowledge or a change in factual data (e.g., new World Record). Furthermore, if multiple users have asked the same question, it may be desirable for a responder to send a single updated answer to each of these users. The system disclosed by Goedken does not disclose a method for establishing such anonymous follow-up communications.

Additionally, Goedken does not disclose a method for implementing "real-time" anonymous communication between a user and a responder. For example, a user may wish to seek information via a plain old telephone service (POTS) telephone call, a voice over Internet Protocol (VoIP) connection call, or an instant messaging service. While Goedken briefly mentions that Internet chat rooms could be used by a user and a responder, Goedken does not describe how such a system would operate in general, and specifically does not disclose how such a system could provide for anonymous communications.

It would be desirable to provide a system that allows information seekers to obtain relevant information from human searchers while maintaining the anonymity of all parties both during an initial session and during follow-up communications or new sessions.

SUMMARY

A system and a method are disclosed for performing a search with the assistance of a computer. The system may assign a unique identifier to a user, to a query submitted to the system by a user, and to a human searcher or provider that may respond to a query. These unique identifiers may be stored in a database, and associated with one another.

The system may receive a query from a user during a first communication session, and present the query to a searcher to perform a search responsive to the query. The searcher may produce search results and transmit the results to the system during the first communication session. The system may receive the search results from the searcher during the first communication session, and forward the results to the user.

Because the system maintains a database of unique identifiers for each original query associated with the unique identifier of the requesting user and responding searcher(s), the system may establish an anonymous communication channel between the user and the searcher during the initial session when the query is submitted and answered, and also during follow-up sessions that may occur in the future.

The ability to reestablish communication anonymously during follow-up sessions may enhance the efficiency of communication between a user and a searcher. For any session which was previously established, the communication can be continued by a user and/or a searcher at any time in the future. This, for example, enables communication in a mixture of real-time media, such as instant messaging or voice, and non real-time media, such as e-mail or message board. A user and/or a searcher may reconnect if a result of a search has been modified for any reason.

Because a unique identifier may be associated with a query, a search result, a user and/or a searcher, a review of queries and/or results can be used to allow establishment of anonymous communication sessions between users and/or searchers based on the content of a query or a result.

These together with other aspects and advantages which will be subsequently apparent, reside in the details of construction and operation as more fully hereinafter described

DETAILED DESCRIPTION OF THE PREFERRED EMBODIMENTS

The embodiments discussed herein relate to a method and apparatus for managing computer files containing documents and images of documents. In the following detailed description, numerous specific details are set forth in order to provide a thorough understanding of the embodiments. It will be apparent to one of ordinary skill in the art, however, that these specific details need not be used to practice the embodiments. In other instances, well-known structures, interfaces and processes have not been shown in detail in order not to unnecessarily obscure the description.

Figure 1:
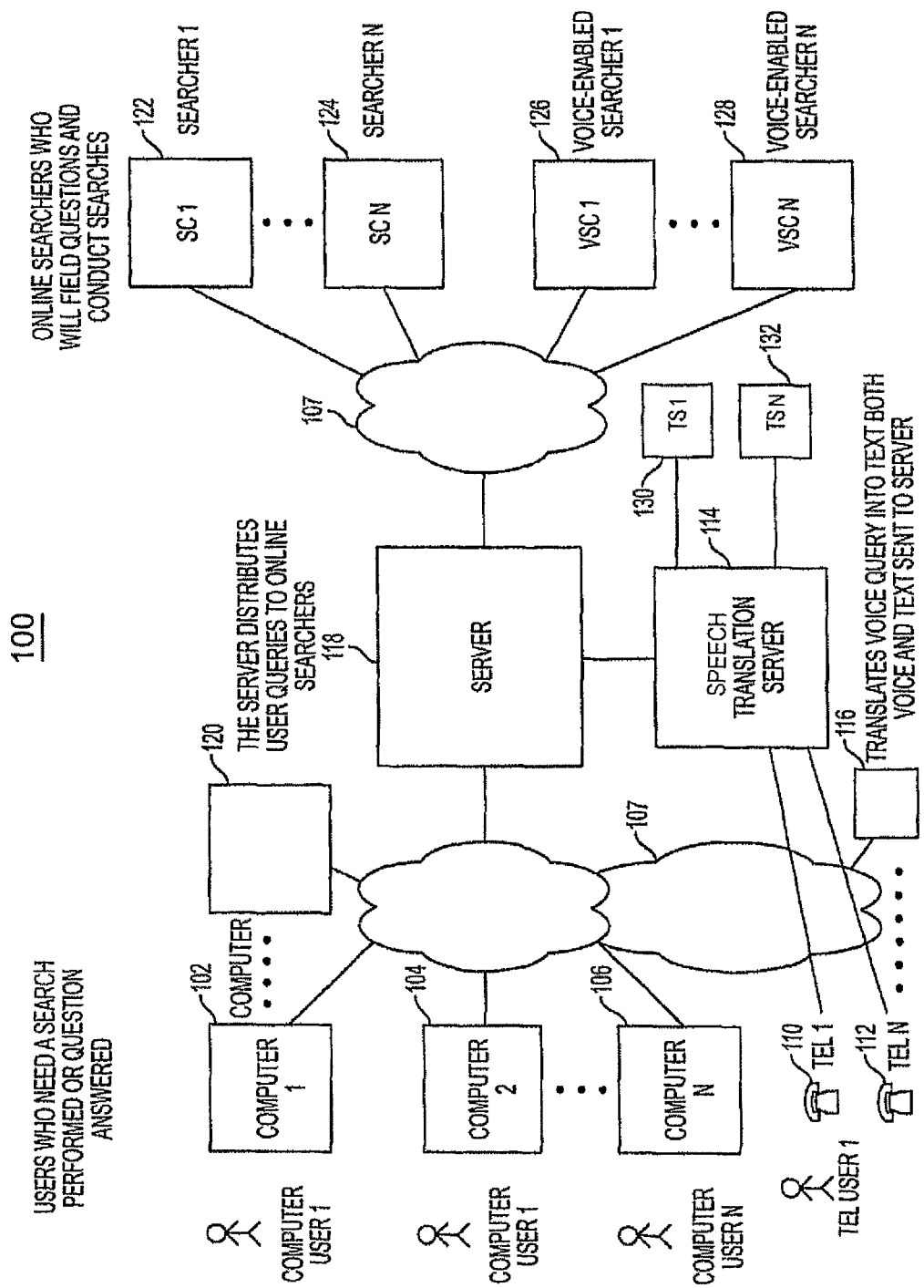
FIG. 1 depicts a system architecture embodiment.

A system 100 (FIG. 1) is disclosed that allows queries by users or requesters (InfoSeekers™), such as a worker, a housewife and/or a child, to be searched by human searchers, providers, or guides who may be professional paid searchers (PaidSearchers™) as well as amateur and/or volunteer searchers, etc. For example, the query (which, throughout this description, may entail a fully-formed question/sentence or a keyword or a list of keywords or a search phrase as previously discussed) might request, for example, the closing time of a particular restaurant, the winner of the 1960 World Series, or information regarding a medical illness (or any other type of query). As depicted in FIG. 1, the queries can originate from user computer systems 102, 104, 106 and are received over a communication system 107 or from telephone handsets 110, 112.

The user computer systems can be typical desktop or laptop systems, such as an IBM® personal computer or a compatible, an Apple® Macintosh® computer, a Sun Microsystems computer, an HP® computer, or the like, a portable computing device, such as a wireless terminal (cellular phone), a personal digital assistant (PDA) or a palm-top computing device running, for example, the Palm™ OS® or Windows® CE operating systems, a handheld computer such a basic cellular telephone, a text-enabled or video-enabled cellular telephone, a specialized query terminal, or any other source that allows a user to enter a query via text, image or speech entry. (Note: the words "speech" and "voice" are used interchangeably in this discussion). The computer systems may each include a windowing graphical user interface, such as X-Windows, Microsoft® Windows®, Darwin, or the like, running on Unix®, Linux®, HP-UX®, Solaris™, MS-DOS®, Mac OS® X, or the like.

The telephone handsets can be typical touch-tone telephones, cellular telephones, two-way radios or any other communication device that allows the user to talk or otherwise communicate over a distance. The communication system 107 (FIG. 1) can include packet switched facilities, such as the Internet, circuit switched facilities, such as the public switched telephone network and DSL/ADSL, radio based facilities, such as a wireless network, physical media, such as Fiber, Fiber Optic Cable, Satellite, and Broadband, and may utilize protocols such as Wi-Fi, TDMA, CDMA, CDMA 2000, WCDMA, GSM, GPRS, EDGE, 3GSM, MMS, SMS, HSCSD, WAP, UMTS, IMMARSAT, Ricochet, PDC (Japan), PHS, TD-CDMA, or other protocols.

The oral speech queries by telephone handsets 110, 112 are stored in the system database and converted into digital text queries by a speech translation server 114. (Alternatively, a user's computer system 102, 104, 106 or telephone handset 110, 112 may perform this processing). The speech translation server 114 handles the task of translating speech into text, possibly by interaction with other systems, or it may perform the task locally. It may perform speech-to-text conversion by using speech transcription using human transcribers and/or using conventional speech-to-text processing, also known as automatic speech recognition (ASR). The speech queries can originate from a user's telephone and can be handled initially via automated attendant speech prompt type processing (or alternatively, via an interactive speech response or IVR system) to obtain the user's query.

The speech translation server 114 (FIG. 1) keeps track of the port from which a call originates and assigns a user identifier to the user of the telephone handset 110, 112 on this port for a particular session. The speech translation server 114 can prompt the user to speak the query. The speech queries can also originate from another source 116 called a "speech query service requestor" (SQSR) rather than directly from the user, such as a private or public information provider. For example, a speech query can be initially processed by a public library telephone system and switched to the speech translation server 114. The speech query may physically arrive at the system via a variety of input means, such as time-division multiplexed lines, voice over IP (VoIP) packets from an Internet connection, or other sources. The speech query may arrive as a stream, packet or series of packets. Similarly, a commercial site, such as a grocery store ordering system where a user can order food and inquire about recipes for a special after-dinner dessert can initially process a speech query and pass it along to the speech translation server 114.

The SQSR 116 (FIG. 1) may communicate with the speech translation server 114 via a variety of mechanisms including an IP-based socket address or via a Microsoft® .NET service, making the translation services of 114 widely available via the Internet to any application that wishes to use them.

The packet(s) may then be processed locally at the speech translation server 114 to convert it from digitized speech into text or, alternatively, it may be processed by a remote system. If the digitized speech is being transcribed by human transcribers, this can be accomplished by sending the digitized speech to one or more transcriber systems (TS) 130, 132 where human transcribers can hear the speech, for example via headphones or speakers, and may transcribe the information by typing the text into their system, so that the text is then sent back to the speech translation server 114 (or alternatively, directly to the server 118 or to the SQSR 116), all within a matter of seconds (preferably less than 10 seconds after the user has finished speaking the query).

To speed up processing, a speech query can be and typically is preferably broken up into a stream of packets and passed to a transcriber, without interruption, as it is being spoken by a user, thereby allowing for reduced latency in the system. Preferably, there are many more transcribers available in the system than there are instantaneous queries so that delays are not induced into the system. In the case of an overflow of queries, a form of flow control may be utilized by telling some callers that they must hold on the line for an available transcriber (which might be described to a caller as holding for an operator or agent). Preferably, the speech translation server 114 (FIG. 1) maintains a database of all transcribers that are currently logged-in and available to perform the service of transcription using a transcription software application on the transcriber systems 130, 132. Alternatively, this function of tracking the availability of transcribers might be located on a remote system and/or might be implemented using a distributed mechanism among transcriber systems 130, 132 (for example, using peer-to-peer mechanisms).

The speech translation server 114 may feed continuous sequential speech phrases from various and different sources (e.g., users) to any given transcriber system 130, 132. Hence, a transcriber may be sequentially transcribing, in rapid succession, speech messages from various speakers and creating separate text packets that are associated with each speech message.

Once a query is in digital text form, it is provided to the server 118. The text entry features of cellular telephones can also be used to enter a query in digital text form allowing users to submit queries textually from telephones.

Queries from a graphical user interface (GUI) of the user computer systems 102, 104, 106 can originate directly from a user, or similar to speech queries, indirectly through a "text query service requestor" (TQSR) 120, which may be any software application or device connected via the Internet, for example. As in the speech query example, a user may be on a grocery store web site ordering food for delivery and may inquire about a recipe for a special dessert. This recipe query would be forwarded to the server 118. Any web site, software application, consumer electronics device, or other device may become a TQSR or SQSR for performing a search. For example, a set top box offered by a satellite TV or Cable TV provider could offer the ability to enter a query string and act as a TQSR or SQSR. Any software application running on a PC, such as Microsoft® Office Word or Excel®, may also serve as a TQSR or SQSR.

An appropriate interface, such as a graphical user interface (GUI) for the computer system 102 (FIG. 1) or speech prompt system in the speech translation server 114 extracts a query from a user and transmits the query to the server 118. Queries originating from image-capable sources (e.g., video-enabled cellular phone, PC with a document scanner, etc.) may contain image(s) as part of the query.

Upon the receipt of a query, such as from user computer 102 in this example, the server 118 can provide information (e.g., advertisements) to a user for the user to see and/or hear while the search is being processed. This information can be related to the query (or to keyword(s) of the query) and may include visual and audio information as appropriate for a user's device and for the source of the query, such as a grocery store ad in the recipe example. This information can include not only advertisements, but also information such as video, audio, music, games, web links, etc. that may interact with and/or display for the user while the search is being performed. The information provided may serve as a source of revenue, for example through advertising. If a user views an ad, or clicks on a link, or purchases a product (sometimes referred to as "conversion") related to an advertisement while awaiting results of a search, the database can be updated to reflect additional ad revenue with a credit of points and/or compensation, if appropriate, to a searcher or provider. A digital text, graphics, audio, or video advertisement may be displayed (or played) on a user computer 102 or on a user telephone 112. A particular advertisement selected may be based on a weight associated with the advertisement based on single or combined factors such as advertiser contract commitments, bidding price of advertisers, popularity with users, keyword mapping to advertisements, statistical usage (e.g., least recently presented), user demographics, geographic data, searcher choice of advertisements, etc.

The server 118 processes arriving queries by determining which searcher(s) are available to search for the information being requested, based upon factors such as a searcher being logged-in, searcher(s) who are associated with a keyword, or category, or the ranking of a searcher based on previous performance.

The server 118 may also determine if a particular query has been queried previously and may send a response to a user with previously obtained search results without necessarily invoking a human searcher.

When no previous query results satisfying, or that may satisfy the query, are available, the server 118 sends the query to one or more of the available searchers over the communication system 107. If a query is a speech query, in addition to sending the text version of the query and the keyword(s), a speech recording of the query and any other associated data of the request can be transmitted. The human searchers can be located at computer-based searcher tool systems 122, 124 (FIG. 1) and/or speech-enabled computer-based searcher systems 126, 128 or any other suitable device for receiving requests.

A server selected searcher (or searchers) can review the query, including the keyword(s) and any speech recording or other data and decide whether to accept the search task. If a searcher accepts the search task, this acceptance may be communicated back to the user who originated the query through the server 118. This may happen automatically or manually. Because some searches may require additional information or clarification, a searcher can send a request for additional information to a user. This may be sent through server 118 or via direct link to a user via the communication system 107. The user may reply with a clarification, additional information and/or a revised query.

The searcher(s) then uses the searcher tool systems 122, 124, 126, 128 to perform a search of publicly or privately available information to produce search results. For example, a searcher may use conventional tools, such as a browser, to access public databases via searches over the World Wide Web or private databases that may be accessible only to the searcher, such as a database of information previously gathered by the searcher, or from results stored on the server 118 from other searchers, or from databases that require payment for access or even information available to the searcher in non-electronic form, such as a book on the searcher's bookshelf, test results from a personal experiment, etc. The searcher may also submit the search query, or some version of it to an automated search tool such as the Google® or Ask Jeeves® systems.

The search results, such as an answer, comments by a searcher, web pages, web links, and other query related information, etc. are gathered by the searcher during a search. The result(s) of the search, such as web pages and links which a user can review or use to obtain the information desired, an answer to a question and web pages or links to web pages that support the answer, etc., is transmitted back to the user through the server 118 or directly to the user via the communication system 107. The information returned is typically what a searcher believes will satisfy a request of a user. The information can include anything that could satisfy a user request, including a document, a video, a song, a configuration file, pictures, links, etc.

The result(s) may be presented to a user in real-time, associated with the amount of time it takes to select a searcher and do the search. One or more available searchers are preferably identified within 1 minute, and more preferably within 15 seconds and a searcher preferably begins the work of performing a search within 1 minute, and more preferably within 15 seconds. Depending on the search, the accumulation of relevant results may generally take from a few seconds to a few minutes. The server or search tool may interact with a user automatically preferably about every 30 seconds, more preferably about every 15 seconds, and still more preferably about every 6 seconds via a chat session (or via a VoIP connection) in order to identify to the user that progress is being made to fulfill a request. This might be as simple as a dot typed on a user's screen or a more detailed automated message.

When on a telephone, a user will preferably be hearing and/or watching an advertisement, but during silent periods, user interaction may occur via speech such as having a searcher or an automated speech system say, "Please continue to hold while your search is being performed". A searcher may interact with a user, either of his or her own accord or the searcher tool may actively require the searcher to give status to the user. The searcher may also send partial results to the user so that the user may begin to preview results. The server 118 (FIG. 1) may store the query phrase and the search results for matching with future queries.

When a user is at a telephone handset 110, there are several ways in which results may be returned to the user from a searcher. Result(s) may be conveyed over a real-time VoIP or circuit-switched connection between the user and a searcher. Along with these speech results, other results may be sent to the telephone via a text-messaging system such as SMS. These other results may be in the form of text, graphics, URLs, audio, and/or video. The results may be an audio message recorded by a searcher and played to the user. Alternatively, a searcher's message may refer the user to sources where the user may obtain an answer. The results of a search may alternatively be digital text that has been converted into audio and played to the user. The results may be an audio message concerning where the digital results, or some other type of results, can be found that are accessible to a user. Text results may be played to the user using speech synthesis or speech reading, as is done with audiobooks. The text may be read aloud in real-time by the same or different resources (e.g., the transcribers described above) that are being used to transcribe speech to text. It is possible to utilize the network of searcher tool systems 122, 124, 126, 128 to perform either transcription of speech to text or the reverse process of converting text to speech. The database may keep track of which searcher tool systems are capable of providing either of these services, potentially with compensation for said services. Although not preferred, in circumstances where needed and/or desired the results may be provided by postal service or other courier.

The user at computer system 102 (FIG. 1) or telephone handset 110 reviews the search results and then does or does not "accept" the results. An acceptance can be in the form of a user moving on to some other pursuit (e.g., logging off of the search site or leaving the system idle), the user actually providing an acceptance by activating ("clicking-on") an acceptance button on the user GUI, the user responding to a request for a user response, such as a pop-up or voice prompt, transmitted to the user computer system 102 or telephone handset 110 by the server 118, the user entering a revised, different or follow-up query, or some other action that indicates the user is satisfied or otherwise found the result(s) useful. The user can register dissatisfaction with the query results by requesting that another searcher perform the search again (typically with the exact same search terms or query), by activating a "try again with same search terms" button or a rejection button on the user GUI, by responding to a request from the server 118, by responding to a voice prompt, or by some other action from the user that indicates dissatisfaction or the desire to "get a second opinion". If the user requests that the search be performed again or expresses dissatisfaction, the server 118 may provide the user's query to a new searcher or searchers.

When a search result is accepted or rejected, a searcher table is updated to reflect the success rate of the searcher. The number of successful searches (accepted, or not rejected, by the user) for each searcher and the ratio of successful versus total searches for each searcher may be used at an appropriate time to compensate each searcher. The compensation may be dependent upon other factors such as transferring a query to another searcher, sending advertisements to users, spending additional time on a search, transcribing voice to text, dictating text to voice, and/or working with particular categories or keywords.

When a query, which can be a natural language query (e.g., a fully-stated question) or a set of keywords, is received by the server 118 process 150 (FIG. 2) running on server 118 (FIG. 1) updates 151 (FIG. 2) the database 156 (FIG. 2) with the query, and source IP address. It is also possible to store other "passive" information about a user, such as address, name, GPS or other geographic information, etc. for clarifying the query or dialogues with a searcher when needed or desired. The process determines 153 whether the query is a previously answered query (PAQ). If so, then the previous query routine 750 (FIG. 5A) running on the server 118 (FIG. 1) receives the query and fulfills the request.

If the server determines 153 (FIG. 2) that the query is not a PAQ, the server parses the query and generates 152 a keyword(s) that may be looked up in the keyword table of database 156.

For later correlation in determining PAQs, the user ID, query ID, and/or the keyword IDs, may also be linked in the database 156. In particular, the database 156 may include a PAQ table (see FIG. 8) that associates a unique identification (UID) of the first user to submit a query to the UID of the query, and the UID of the first searcher to respond to the query (discussed below). The UIDs may be generated sequentially, randomly generated, or generated based on the date, users IP address, or the like. By tracking the first user and searcher involved in a particular query transaction, both users and searchers may access prior queries for which they provided the original query or response.

Figure 2:
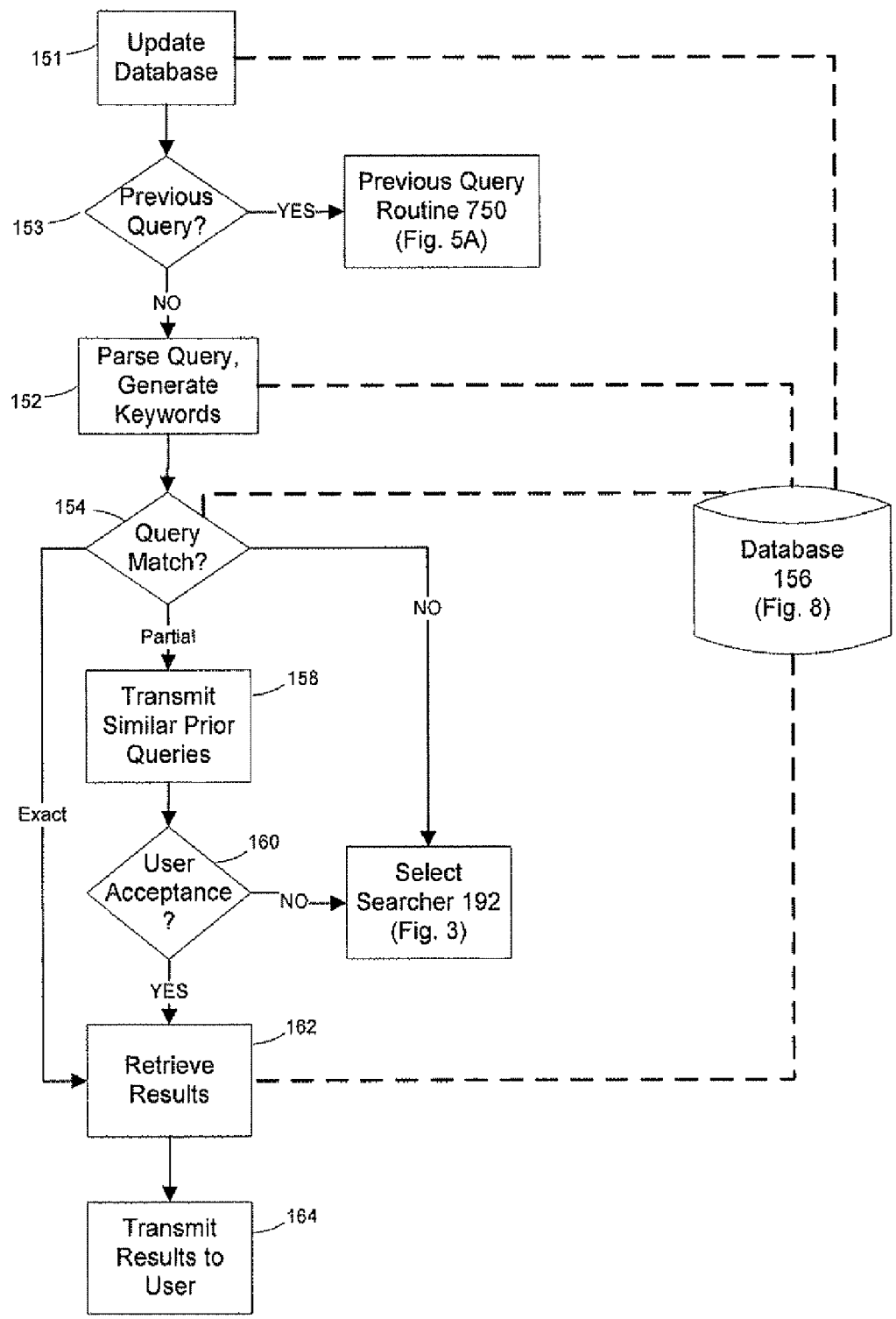
FIG. 2 is a flowchart for locating prior queries.

In the keyword table (see FIG. 8) of database 156 (FIG. 2), a weighting can be attached to any keyword that determines how influential it is in determining what group of searchers to select. At the time that a query is received, the server can also send information, such as an advertisement, to a user computer system 102 (FIG. 1) for display thereon. The advertisement(s) can be linked to one or more of the keywords of the query. The advertisement(s) may alternatively be chosen randomly from an advertisement table (see FIG. 8) of database 156 (FIG. 2). The information sent to a user may also indicate that the system is "finding a searcher". It may also be possible to delay the sending of an advertisement until an appropriate searcher (or searchers) is selected. That searcher (or searchers) may have the option to choose an advertisement(s) that is sent to the user, which might be based upon the query and/or keyword(s) and/or a searcher's assessment of which advertisement(s) to send. This advertisement choice may be accomplished by a searcher predefining which advertisement (s) should be displayed and/or played for a user that is sent to a searcher associated with a particular keyword.

The parse operation can also check a query to see if it is a follow-on query to a previously submitted query by a particular user during a particular session, for the purpose of having the same searcher(s) handle a follow-on query from the user. This may be determined by checking whether the user has previously received search results in this session and comparing keywords of the previous query to the current query, or by examining a follow-on query flag set by the user's browser or search application if the user chooses to modify the status of a particular searcher (e.g., by clicking a button that says, "If possible, give me this searcher again if I search in this topic area").

Cookies may be used to store keyword and searcher information on a user's computer or device given that the server may not know the true identity of the user. If so, the database 156 (FIG. 2) can be updated to link a query to the searcher that handled the prior query or preferably to set the rank of this searcher to the highest value temporarily for that user ID when associated with a given keyword. These cookies may be persistent cookies that store a unique identification for this user (user UID), so that when the user returns, he or she may access prior queries, prior advertising, or previously answered queries. Even though the user may remain anonymous, because one or more cookies may contain the user UID, the user may contact searchers with whom the user has previously communicated.

If users become comfortable identifying themselves when searching, then the server 118 (FIG. 1) may perform the function of linking user and searcher if the user and/or searcher make such a request for continued connection. As an incentive to a user to provide identifying information such as name, user ID, e-mail address, or the like, this option of getting repeat service from highly ranked searchers can be offered to a user. This process is described in greater detail in relation to FIGS. 9A-9E, below.

The query is then matched 154 (FIG. 2) to previous queries stored in database 156. The database 156, among other things, may store the previous queries (or a subset of previous queries, such as the ones that are still considered relevant, wherein said relevance might pertain to time, location, or subject matter, etc.), the corresponding keyword(s) that resulted from the previous queries and the accepted "relevant" results associated with corresponding keywords and queries. This matching can compare the keyword(s) of the current query with the keyword(s) of previous queries for an exact, partial or fuzzy (highly similar) match. This may result in multiple previous queries matching the current query. If a match does not occur, the process 190 associated with selecting a searcher (or searchers) to perform a search continues (see FIG. 3).

If an exact match occurs 154 (FIG. 2) the system proceeds to retrieve 162 and transmit 164 the corresponding search results and possibly deliver a new advertisement(s) prior to or alternately, concurrently to delivering the search results to a user.

If a PAQ(s) is a fuzzy or partial match 154, a number of the closest matching previous query phrases, such as the top three, can be transmitted 158 to and displayed or spoken for a user. The system may also send a new advertisement(s) to the user and/or await a reply from the user as to whether any of these query phrases are an acceptable response to the current query. If the user acceptance 160 (for example by clicking on a GUI button or cell phone key to indicate the user wishes to proceed with the original phrasing of the query) indicates that none of the "matching" queries is an acceptable response to the query, then the process 190 associated with selecting a searcher (or searchers) to perform a search is executed (see FIG. 3).

If the user accepts 160 (FIG. 2) one of the partial matches as a reply to the query, the system retrieves 162 the results from the database 156 and transmits 164 the results to the user (the system may be configured to present an advertisement(s) as part of the results). If the results are accepted by the current user (i.e., considered relevant again), the searcher who produced the results may be compensated, based on data stored in the searcher table (see FIG. 8) of database 156 (FIG. 2). The query results may be kept in the database 156 when users find the results relevant. If a certain threshold (configurable at the system level) of users consider the results not relevant or not acceptable, the results may no longer be offered to future users (and the results might be deleted from the database).

Figure 3:
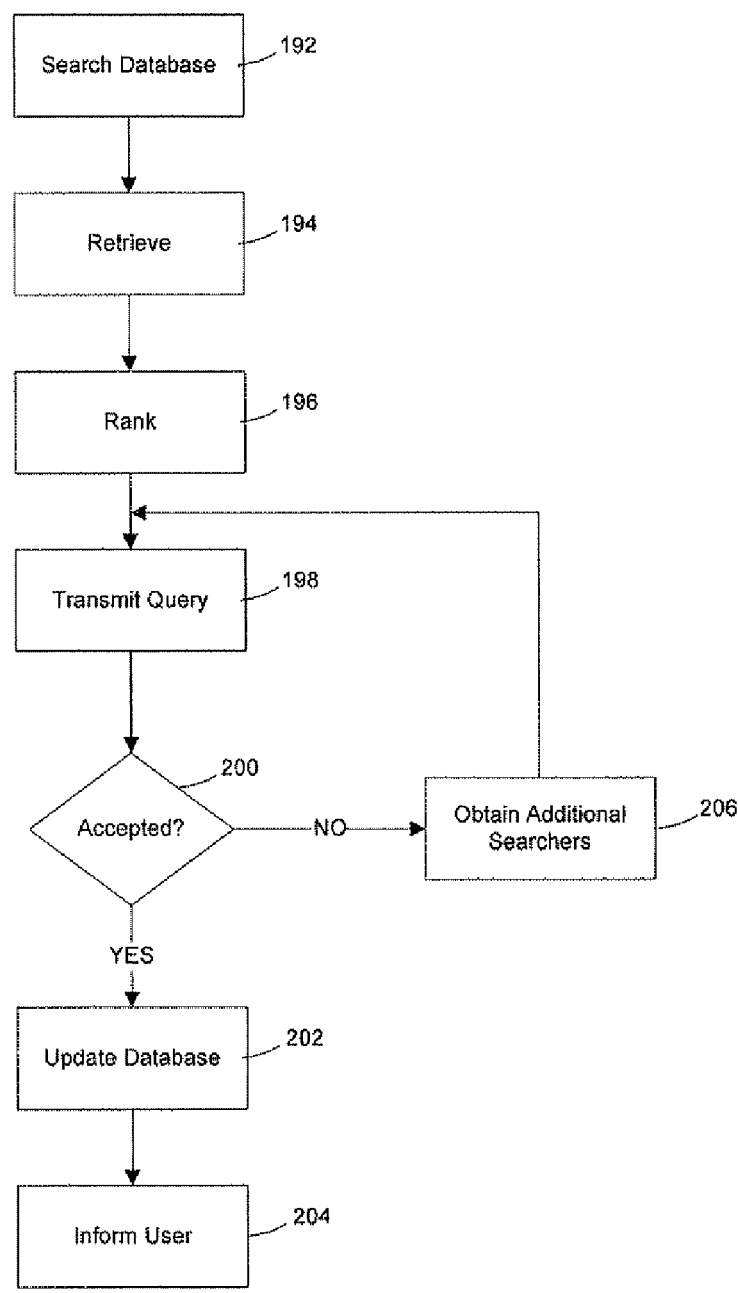
FIG. 3 is a flowchart for selecting a searcher.

If the query does not result in the use of previous search results, the process 190 of FIG. 3 continues and the keyword (s) of the current query are used to select 192 a searcher. At this time, the keywords may also be sent to a conventional search engine(s), such as Google®, to have a search performed, the results of which may be passed to the provider(s) selected to fulfill the search. To select a searcher, keyword(s), corresponding database entries, such as searcher identifiers, searcher success rate, availability, etc. are retrieved 194. The keywords found in the database 156 (FIG. 2) may be ranked according to the importance they may carry in a search query, or according to any other suitable ranking method.

Figure 3A:
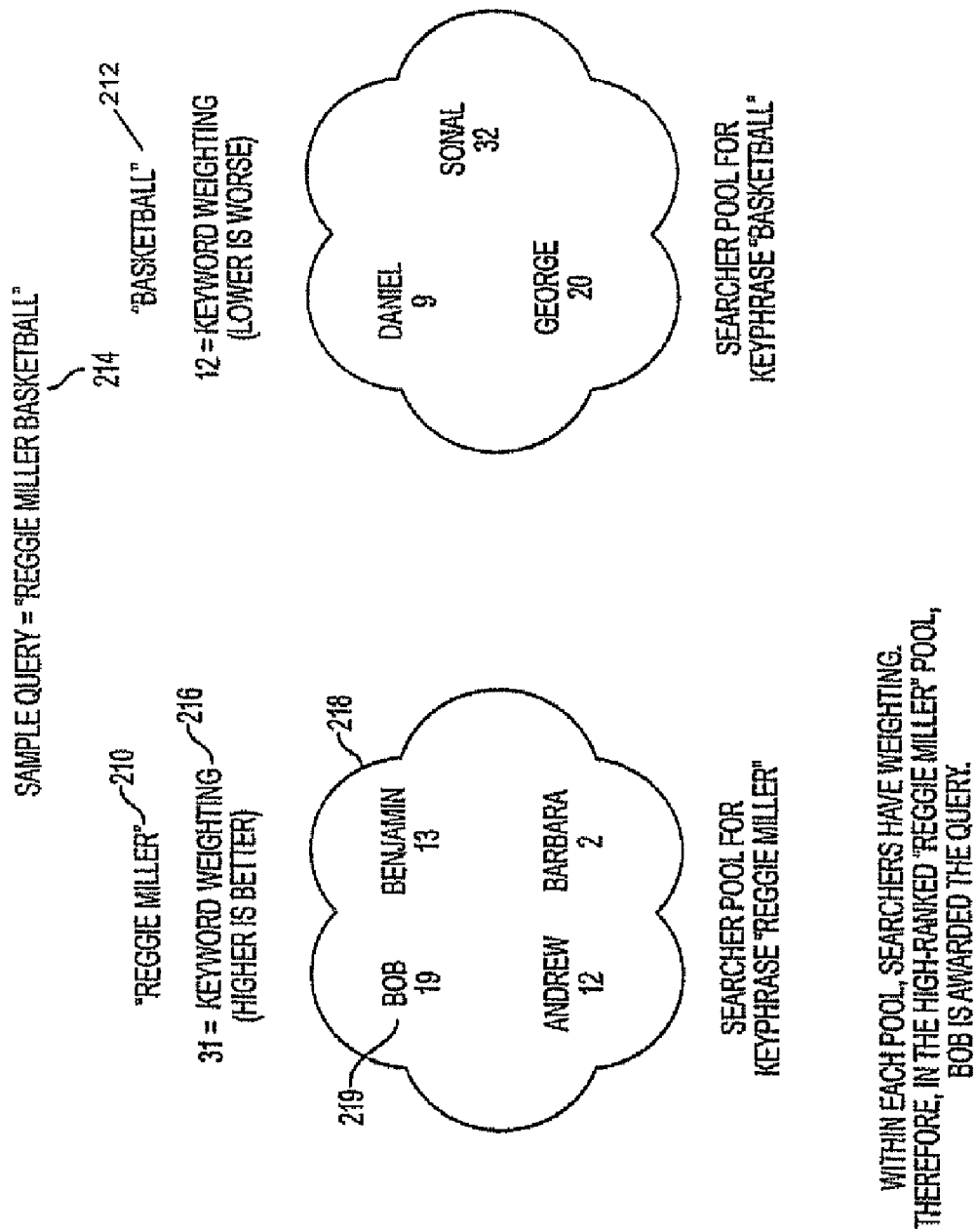
FIG. 3A is a diagram illustrating how a searcher is selected.

In at least one ranking method a keyword such as "Reggie Miller" 210 (FIG. 3A) might be ranked higher than a keyword such as "basketball" 212 because "Reggie Miller" is more specific. Therefore, generally, if a searcher is associated with a more specific keyword, then it is desirable to have the more targeted searcher respond to a user request. Hence, in a query such as "Reggie Miller basketball" 214, a searcher would be selected based on the highest-ranking keyword 216 of the query, which is a searcher associated with the keyword "Reggie Miller", and therefore should have more targeted domain-specific knowledge about Reggie Miller than a searcher associated with the keyword "basketball". (An automated mechanism for ranking keywords is described below). Within the searcher pool 218 (FIG. 3A) for a keyword, the searcher with the highest rank 219 would be chosen by the server 118 (FIG. 1) to receive the query. Words such as "a", "an", "the", "is", "what", "why", and "how" might be given a low keyword importance rating.

If there are multiple searchers in the pool representing the highest-ranking keyword 216 for the query, then the highest ranked searcher 219 of that searcher pool 218 may be selected first. A list of available searchers is sorted or ranked 196 (FIG. 3) according to one or more of the number of keywords of the query that match corresponding keywords of a searcher, keyword rank, searcher rank, the success rating of the searchers, etc.

If a searcher is signed-up for multiple keywords in a query, (e.g., a searcher might be signed-up for both the keyword "baseball" and the keyword "world series"), then that searcher may take priority over searcher(s) who are signed-up for fewer matching keywords in the search query phrase (e.g., a searcher who is signed-up for the keyword "baseball" or the keyword "world series" but not both).

If a query is a follow-on query and a user has indicated a desire to have a previous searcher help with future searches related to a keyword or category, the "legacy searcher" could be ranked the highest in the list. For the top ranked searcher, the query, including keywords, etc. is sent 198 (FIG. 3) to his or her search system, for example, system 122 or 128 (FIG. 1). An alternative implementation could send a query to multiple searcher systems, for example, searcher systems 122, 124, 126, 128 simultaneously to determine which available searcher will respond to the query most quickly. Similar to a game show, the first person to hit the "I'll handle the search" or accept button "wins" the search. Alternatively, multiple searchers may search a query and the aggregate results could be returned to the user (possibly with multiple chat sessions between the user and searcher(s) to enable clarification, etc.). If one or more keywords are not found in the database 156 (FIG. 2), the database can be updated to include the keywords and the keywords may be linked to the query. Searchers can then register to be associated with the new keywords in the future.

If no searcher is selected for a query, then the server may forward the query to "generalist searchers" who attempt to answer queries in any category or the system may deliver the query to a search engine(s) and/or meta-search engine(s) to provide a user with a base level of functionality that is not worse than that of other search engines. The results are passed back to the user. A query may be passed to a system of experts who answer questions on a website such as Google® Answers or Yahoo!® Answers, and a user may be given a pointer to the location of the query which may be answered in the future. These systems may not give real-time feedback, but the user may check back in the future.

If the system has stored a new keyword(s), searchers may choose to be associated with the keywords. A keyword table of database 156 (see FIG. 8) may be inspected by a searcher(s) to determine the ranking, traffic, and/or searcher(s) related to a keyword(s), which can further inform (and possibly motivate) a searcher(s) to be associated with a keyword(s).

If the search is accepted 200 (FIG. 3) by one (or more) searcher(s), the database is updated 202 to link the searcher (or searchers) to the query, keywords, etc., and may indicate that the searcher is handling a query, etc. In the case where a query is sent to multiple searchers, it is possible to configure the system to inform some or all of the notified searchers, except the first to accept the query, that the query has been accepted by another searcher and indicate that they may choose to discontinue searching. The searchers may be made "available" to accept other queries. It is also possible for the system to allow the searchers who have accepted the query to continue the search. If at least one searcher has accepted the search, a message may be sent 204 to a user to indicate that the search is "in progress". The message may be accompanied by other information, such as an advertisement, or other relevant information. Advertisement(s) can be selected by the server 118 (FIG. 1) and/or selected by a searcher based on the query (and/or keywords) accepted. If an advertisement suggested by a searcher is sent to a user, the database 156 (FIG. 2) may be updated to indicate that the searcher is to be compensated for the advertisement being sent to the user.

In the case where searchers are notified sequentially and the currently-selected searcher does not accept the search (either by pressing a button to "reject" or by not responding within a (configurable) preferably short period of time such as 6-18 seconds), the next highest ranked searcher is obtained 206 (FIG. 3) from the list and the query is sent 198 to that searcher. Since it may take more time than a user is expecting to find a searcher in this situation, the server 118 (FIG. 1) may send additional information to the user, such as a game, a video or other advertisement such as an interactive advertisement. The user is or may be updated periodically of the search progress.

If a searcher does not feel qualified to conduct a search sent to him or her, then it is generally better for the searcher to do a "transfer to another searcher" to expeditiously get the user better results from another searcher. This preferably creates a better user experience. A searcher may be compensated in some way for choosing to transfer a request to another searcher. In some cases, the compensation for the original searcher may be gated by the success of the next searcher. However, if a search is transferred more than a preset number of times (e.g., three times), then the server preferably may return the "default" answer of at least one of the top search engines for this query string. This ensures that the user is receiving no worse results than those of other top search engines. A user, a provider or the system may be able to select which search engine is used as the "default". This information may be stored on the user's local system (e.g., as a cookie) or if the user is "logged-in" to the server, then user profile information may be kept there. A gift certificate or prize may be awarded in this case in order to encourage the user to continue using the human-assisted search engine even though a searcher was not readily available for a particular search. The query may also be passed to a question/answer website such as Google® Answers or Yahoo!® Answers for an eventual answer to the query from an "expert" from those websites. The user would be given a link to the query at the other website.

If the end of a list of available searchers is reached, the system may obtain additional searchers 206 (FIG. 3) that have become available since a query was received and notify the searcher(s) of the query or may assign the query to an available searcher registered for general searches. The system may use a variety of mechanisms such as using thesaurus-like relationships between words to send a query to a searcher that is associated with a keyword pool that is deemed closest to the keyword(s) of the query. The system may be configured to set the threshold for the degree of closeness of the parsed query keyword(s) versus the searcher pool associated with a related keyword. Results from other search engine(s) may also be provided.

Figure 4:
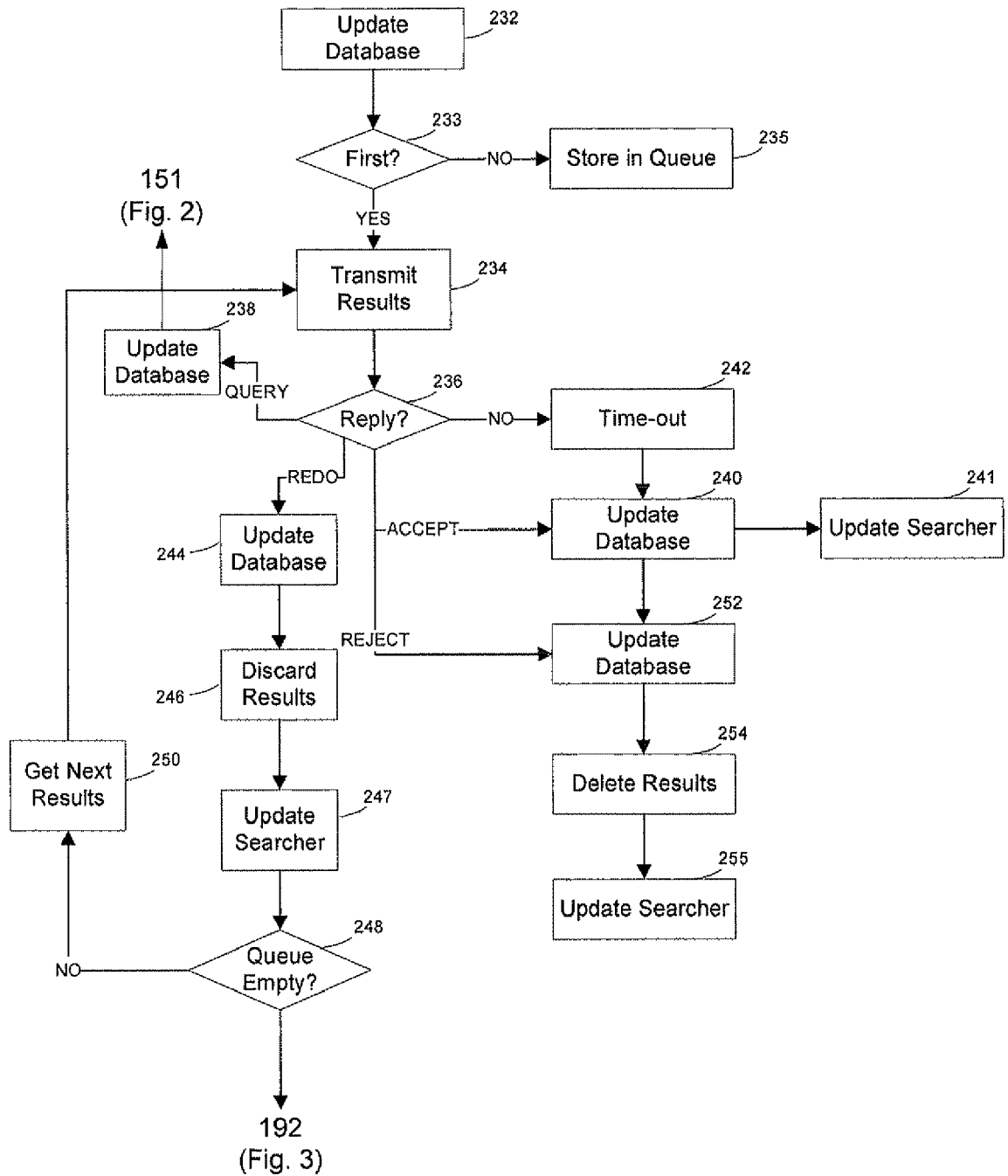
FIG. 4 is a flowchart for search result processing.
Figure 8:
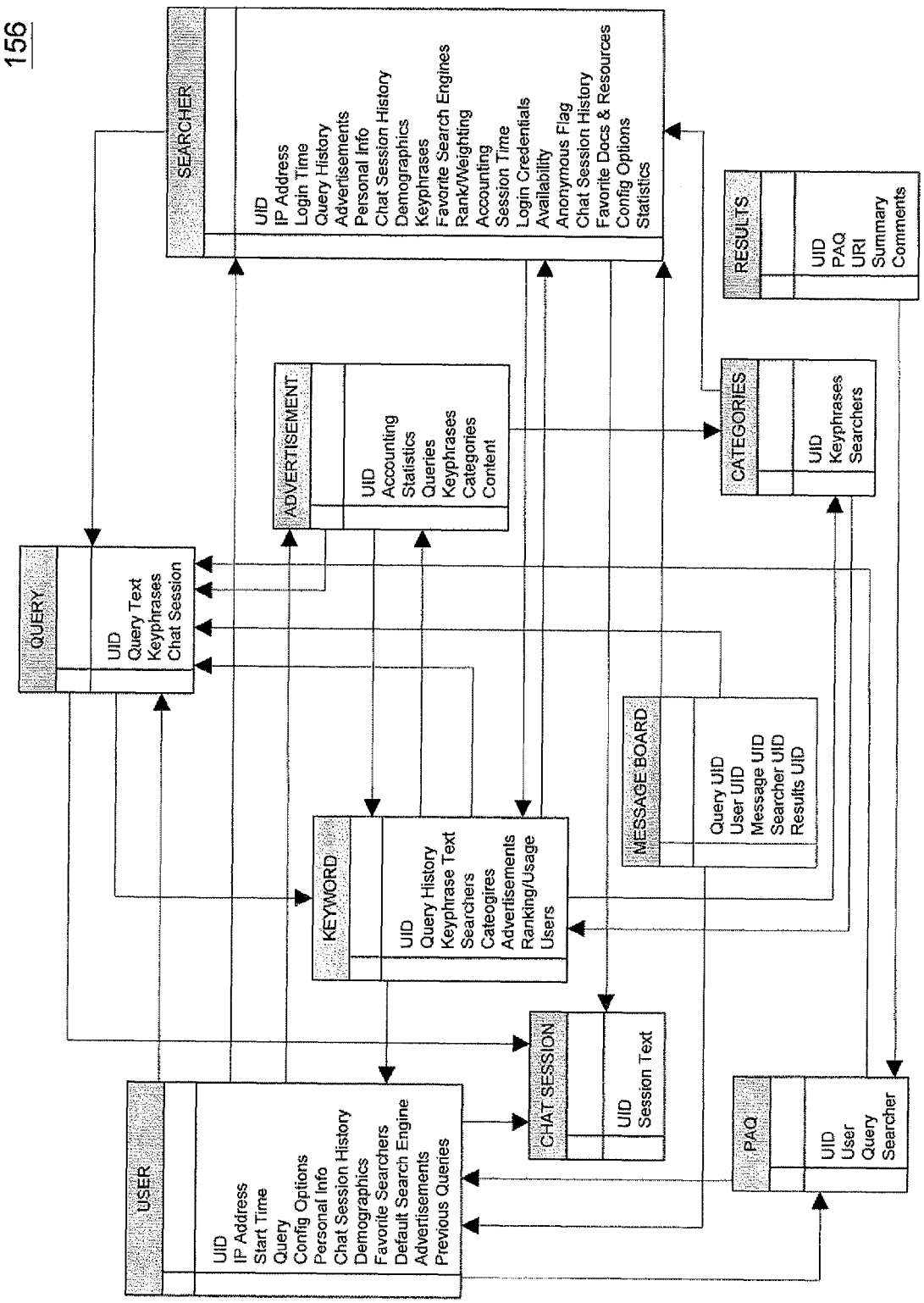
FIG. 8 is a diagram illustrating a database relationship.

When search results are received from a searcher, the database 156 (FIG. 2) is updated 232 (FIG. 4) to store resources (URLs, file names, etch) linked to the keywords, the query, the searcher, the time required to complete the search, etc. and the results. For example, as shown in FIG. 8, the database 156 may include one or more of a query table, a user table, a keyword or keyphrase table, a message board (and/or chat session) table, an advertisement table, a searcher table and other data structures. Because a user, a searcher, and a query each have a unique identifier, a user and/or a searcher may access any past queries, results and resources related to them.

Further, a previously answered query table (see FIG. 8) contains the UID for each original query, a UID for the user who poses the query and a UID for the searcher (or searchers) who answer the query, and the message board table includes the UID of the query, the user and the searcher including a message ID of a message. Therefore, by searching the PAQ table, the server 118 (FIG. 1) may establish an anonymous communication session, via any of the communication modes discussed herein, between a user and a searcher based on only the UID of a past query. This, for example, allows a user and/or a searcher to search their PAQs, select a PAQ, and communicate with the respective other party, without having any identifying information for the other party beyond that fact that they were associated with that PAQ. Because of this, even though each query has a UID, hundreds, or thousands, of users and/or searchers, may read each query. Therefore, it may be desirable to limit the ability of a party to establish communication with a party originally involved in a search transaction linked to the original parties.

If the system has been configured to allow multiple simultaneous searches based on a query, and if there is a first 233 (FIG. 4) set of search results, those results are transmitted 234 to the user (which is the case when the query is sent to only one searcher). For a telephone-based user this may involve converting the results into audio information or transmitting the information to the user via a text message (or mail), or both. The transmitted text, audio or mail may also include an advertisement(s) linked to the keywords or selected by a searcher. If a result is not the first set of search results, the search results may be temporarily stored 235, for example in a push down type results queue and the replying searcher may be notified that the results are in a results waiting queue.

After a result is transmitted 234, the system then waits for a reply 236. If the reply is that the user wishes to perform an entirely new query, the database 156 (FIG. 2) is updated 238 (FIG. 4) to reflect the search results and the processes 150 and 190 of FIGS. 2 and 3, respectively are executed for the new query. The update 238 (FIG. 4) updates the query, keywords, results, user, and searcher(s) entry(ies) in the database 156 (FIG. 2). If the reply is an explicit acceptance, such as the user clicking an accept button of a user GUI or the user logging out of the search system, the system updates 240 (FIG. 4) the database 156 (FIG. 2), may delete the contents of the queue, etc. and updates 241 (FIG. 4) searcher entry in the database 156 (FIG. 2). The user may be sent a message and advertisement(s) linked to the search results. The human searcher may be notified of the user's acceptance of the results.

If the period for a reply times-out 242 (FIG. 4), indicating that the user has moved on, the system updates 240 the database 156 (FIG. 2) to reflect a successful search. The database entry for the human searcher is updated 241 (FIG. 4) about the successful search. That is, the database 156 (FIG. 2) is updated to reflect a successful search having been accomplished by this human searcher (allowing the human searcher to be compensated), linking the stored successful search results with the searcher and the query, keywords, etc. The human searcher may be notified that the user has accepted the results by default.

If the reply 236 (FIG. 4) indicates that the user is requesting that the search be redone with the same query, the database is updated 244 to reflect an unsuccessful search, the search results may be discarded 246 (or may be made unavailable in future searches although the results may be kept for auditing purposes) and the database entry for the searcher is updated 247 to reflect that the search was unsatisfactory for the user. The searcher may be notified that the results were not acceptable. If the queue is empty 248 a new searcher is selected to perform a search for the query using process 190 (see FIG. 3). This redo reply may also result in the system sending the user a message indicating the system is repeating the search, and/or information to entertain and/or engage the user, such as a video clip of a popular comedy or an advertisement that includes a discount coupon. The database update 244 (FIG. 4) updates the total number of searches by this searcher without updating the number of successful searches, deletes (or marks as not to be used) the search results of this search, etc. If the search results queue is not empty 248, the next entry is taken 250 from the queue and transmitted 234 to the user.

If the reply is rejected, the database is updated 252 to reflect an unsuccessful search, the results may be discarded or deleted 254 and the database entry for the searcher is updated 255 about the rejected search. That is, the total number of searches for this human searcher is updated without updating the successful search total; any comments provided by the user are linked to the searcher, etc. The human searcher may also be notified. The system may send the user a message apologizing for the failure and/or some sort of inducement to use the system again, such as a free popular video, song, game, discount coupon, etc. A set of results from one of the top-ranked search engines using the user's original query may be sent to the user. A user may be able to specify a default search engine to be used in such cases.

Figure 5:
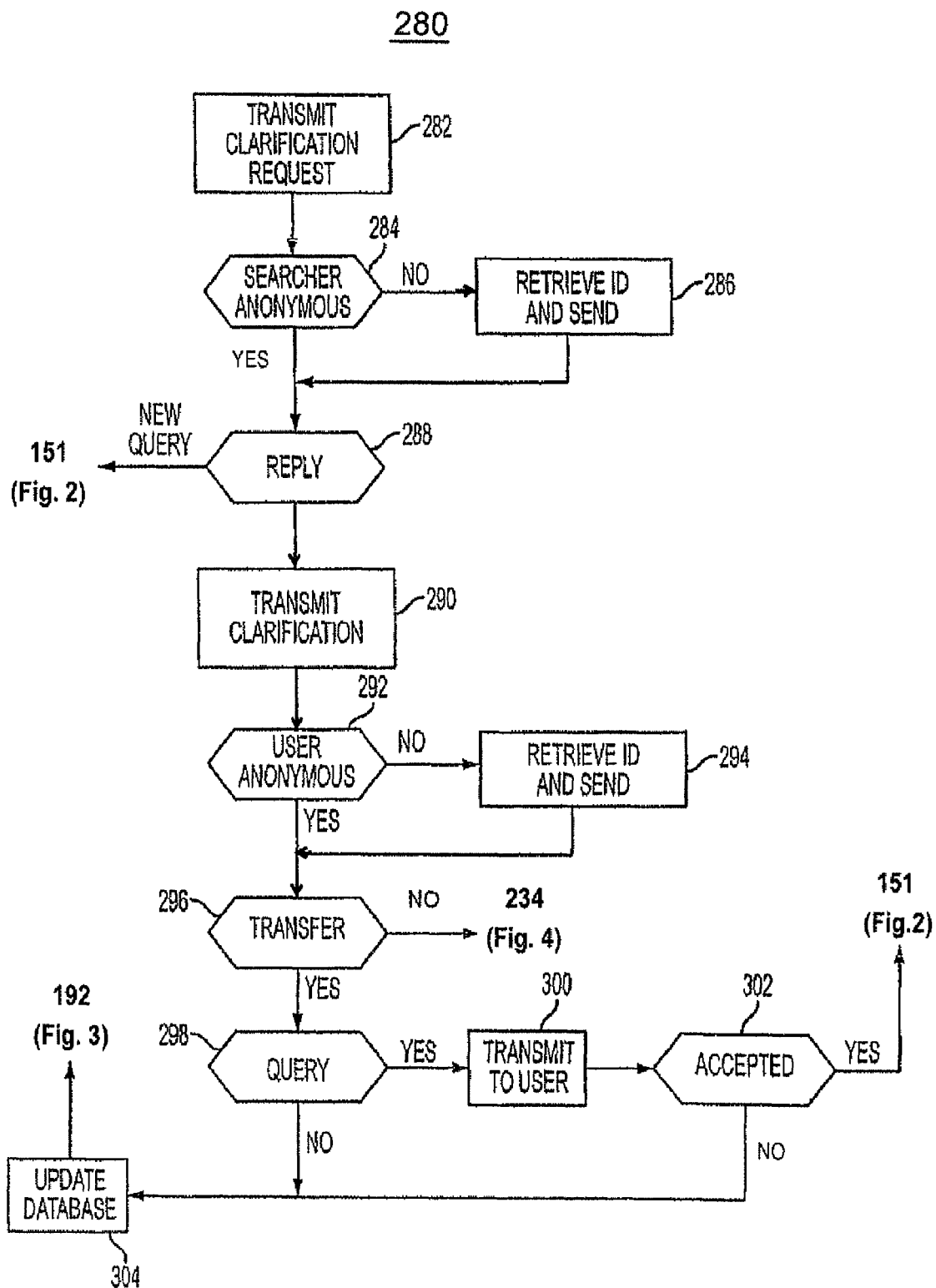
FIG. 5 is a flowchart for query clarification operations.

When a clarification request is received by the server 118 (FIG. 1) the process 280 (FIG. 5) starts when the clarification request is transmitted 282 to the user, such as to system 102 (FIG. 1). The clarification request may be sent to other searchers who have accepted the query. A clarification request can be in the form of a digital message, such as an instant message (IM), an audio message, using a voice over IP (VoIP) connection, a speech message packet that can be played by a user computer or telephone, etc. The system also checks the request and the database 156 (FIG. 2) to determine 284 (FIG. 5) if a searcher has indicated a desire to remain anonymous.

If the system determines 284 that a searcher has not indicated desire to remain anonymous, the searcher identity (e-mail address, name, etc.) is retrieved from the database 156 (FIG. 2) and transmitted 286 to the user. The system then awaits a reply 288 (FIG. 5) from the user. If the reply is a new query and the system returns to the PAQ and searcher selection processes 150 and 190 (see FIG. 2 and FIG. 3).

The user reply 288 (FIG. 5) can be a message that provides additional explanation of the query to the searcher. This clarification message is transmitted 290 to the searcher. If multiple searchers have accepted the query, the system may provide the clarification to all searchers. The system may provide the entire chat interaction to all participants (i.e., the user and one or more searchers). The system then checks 292 the original query and the database 156 (FIG. 2) to see if the user desires to remain anonymous and, if not, the user's ID info is retrieved from the database 156 (FIG. 2) and sent 294 (FIG. 5) to the selected searcher(s). The system then awaits the results of a search or another clarification request. The system may allow the user and searcher to communicate independently for further clarification when they do not remain anonymous or all requests can be routed through the server 118 (FIG. 1) either anonymously or fully identified or partially identified.

A searcher, once clarification is obtained may recognize that a query is out of the searcher's search expertise and the searcher may choose to transfer 296 (FIG. 5) the clarified query to another searcher. As part of the transfer, the searcher may clarify the query for the next searcher (and for the user). The clarification of a query may include a searcher's classification of the query as relating to a particular topic, and/or category, in addition to or instead of the selection of an alternate keyword of the query. For example, a query may consist of a single keyword (e.g., "apple"). Classification of the keyword or query by a user's intended meaning may allow selection of a more suitable searcher pool and/or searcher. For example, qualification of keyword(s) discussed in U.S. patent application titled METHOD AND SYSTEM FOR QUALIFYING KEYWORDS IN QUERY STRINGS, inventor Scott A. Jones, the disclosure of which is incorporated herein by reference may be used. The system, when such a transfer request is received, checks 298 (FIG. 5) to see if the transfer includes a searcher suggested query. If so, the query is transmitted 300 to the user and may be displayed as a revised query in the query frame or as a revised query in the clarification request/answer frames of a user GUI.

A rejected query may be used to update the database 156 (FIG. 2), which may include removing the link between the query and the searcher. Alternatively, the user may accept 302 the modified query and invoke a new search with the modified query. The searcher may transfer a query without incurring an update to the searcher's statistics that indicates the searcher did not produce successful search results. That is, a searcher may not be penalized for recognizing that they cannot fulfill a query. In this case, the searcher has an incentive to transfer a query when he or she does not feel qualified to perform a given search. If the user does not accept the revised query or the searcher did not produce one, the database is updated 304 to mark the query as a transferred query, the link to the searcher is updated reflecting an unsuccessful search and the system selects another searcher or set of searchers for the query using the process 190 (see FIG. 3). In this event, the searcher may also not be penalized. When a search is transferred, any or all of the "instant message" or "chat" interaction and other resources from the first searcher may be transferred to a subsequent searcher so that there is history and context that does not need to be repeated between the user and searcher. When a searcher decides to transfer a query to a new searcher, the searcher may press a "transfer" button 554 (FIG. 10B) on the searcher tool screen 550.

Alternately, a searcher may transfer a search to another searcher by selecting the keyword and/or meaning of the query that seems most likely to have searchers that will know the answer to the user's query. In other words, a human may be able to determine what seems to be the most relevant keyword in and/or intended meaning of the search query. When the searcher clicks the "transfer" button 554 (FIG. 10B), a new screen 650 (FIG. 10D) may allow the searcher to perform a transfer operation. A query string is presented in frame 652 to the searcher with identified keywords displayed below the query string in frame 653. For the example query of "world series winner 1960", there might be keywords "world", "series", 4"winner", "1960", "world series", and "world series winner" that searchers might have signed-up for. By selecting keyword "world series winner" 656 a human searcher may select a searcher out of a pool of 2 currently logged-in "world series winner" searchers who are most likely to find relevant results regarding winners of the World Series. By selecting the button 656, the human searcher affects a transfer to this new searcher pool. By choosing a searcher that is most likely able to give relevant results, the original searcher may be compensated if the subsequent search is considered successful by the user. A searcher(s) may be selected from the pool and the query is transmitted to the searcher(s).

The "transfer" capability can be used to give keywords their ranking (see above regarding importance of having a ranking for keywords in order to select which pool of searchers to choose from during the initial routing of a query to an appropriate searcher). If an initial searcher (associated with an initial keyword) picks a different keyword to send with the query, then the weighting of the initial keyword decreases and the importance of the new keyword increases. Therefore, over time, when the two keywords show up in the same query phrase, the higher-weighted keyword selects for the searcher pool that will get the initial notification to perform the search. The weighting can be kept on a global basis, decrementing and incrementing the weightings no matter what are the keyword pairings. An alternative approach that may require more resources but may provide better results is to store keyword pairs and monitor the weighting within the specific pairing. An example of this might be the query, "How many police helicopter pilots are there in the NYC area?" which might initially trigger a search performed by a searcher (or searchers) who has signed up for the keyword "police". However, over time, it might be that those searchers do not feel competent to deliver an answer so they transfer to searcher(s) linked to the keyword(s) "helicopter" and/or "helicopter pilot". Over time, the latter keywords may become higher-weighted so that such a search would go to the "helicopter pilot" searchers first, instead of the "police" searchers. Initial keyword weightings may be assigned based on keyword or word frequency of occurrence in web documents, search queries from other search engines, etc.

When a transfer of a query occurs, the system can send a message to a user that another searcher is being sought to handle the query in order to give the user better service. Information to entertain and/or engage the user, such as an advertisement or other information can also be sent.

When a user initially submits a query, the query is submitted and answered (responded to) during a first communication session. For example, the user computer system or user telephone may maintain an open channel to the server 118 (FIG. 1). For example, both the server and the user computer system may have a TCP or UDP port open during the first communication session, and after the first communication session ends, the ports will be closed or assigned to another connection.

Later, during a second communication, if a user submits a request for one or more previously answered queries (PAQs), this request is detected 153 (FIG. 2) by the server 118 (FIG. 1), and the previous query routine 750 (FIG. 5A) handles the request. The server retrieves 752 the UID of the user and the UID(s) of the query(ies) associated with that user from the PAQ table of the database 156 (FIG. 2). The server 118 (FIG. 1) next determines 754 (FIG. 5A) whether the user has any PAQSs. If not, then the server returns 756 a "no previous queries" message to the computer associated with the user. If, on the other hand, the server 118 (FIG. 1) determines 754 (FIG. 5A) that the user does have previously answered queries, then the server returns 758 one or more of those queries from the database 156 (FIG. 2) to the user computer associated with the user.

Figure 5A:
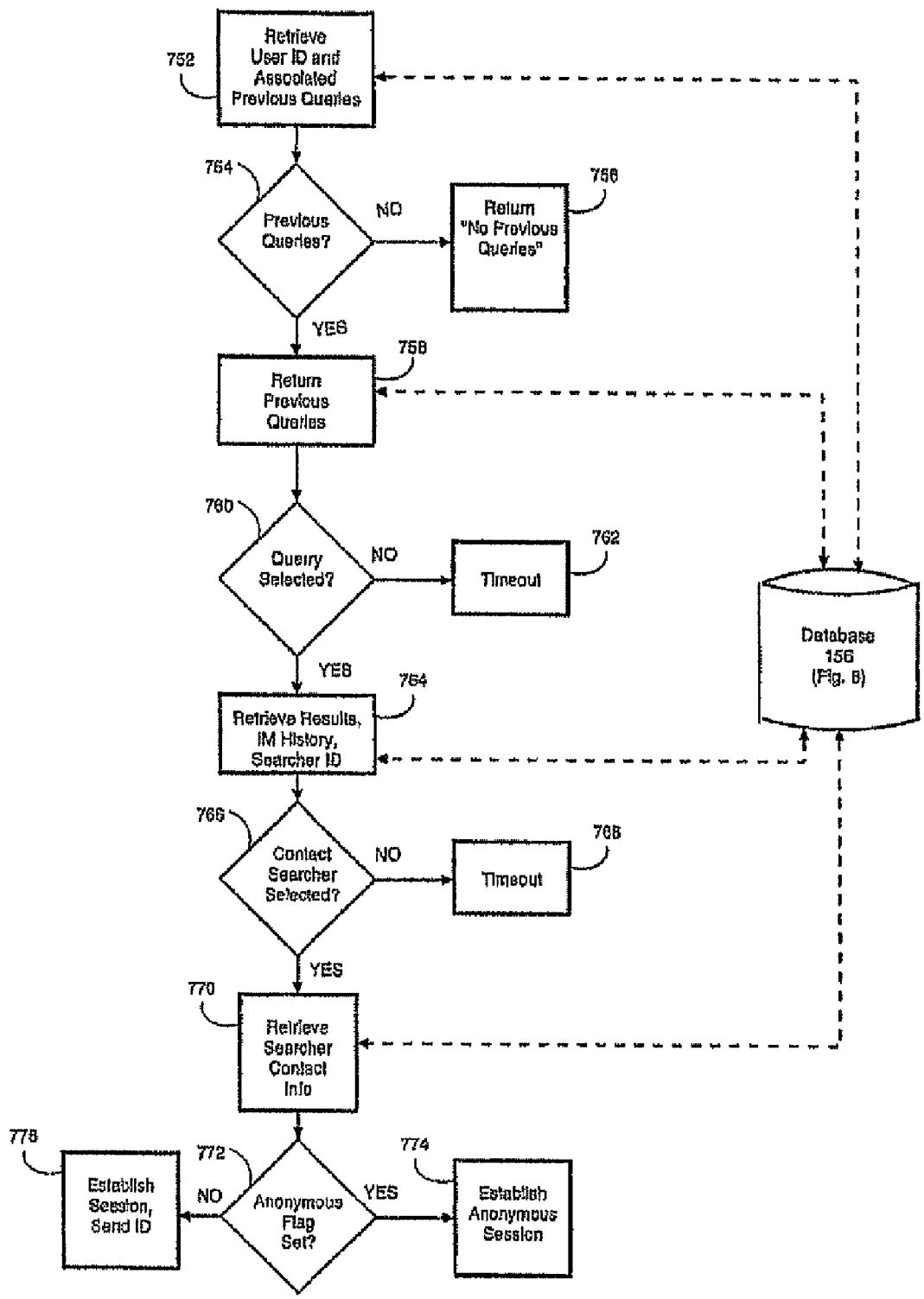
FIG. 5A is a flowchart for anonymous communication operations.

The server next determines 760 whether the user selected one of the previously answered queries, if not, the server 118 (FIG. 1) times-out 762 (FIG. 5A). If the user selected one of the previously answered queries, then the server 118 (FIG. 1) may retrieve 764 (FIG. 5A) for the PAQ the instant message or other communication history, searcher UID, and/or results from the database 156 (FIG. 2) based on the UID of the query. The server 118 (FIG. 1) next determines 766 (FIG. 5A) whether the user selected a method of contacting the searcher associated with the selected PAQ. If not, the system times-out 768 (FIG. 5A). If the user did select a method by which to contact the searcher, then the system retrieves 770 the searcher contact information from the database 156 (FIG. 2) based on the searcher UID.

The server next determines 772 (FIG. 5A) whether the anonymous flag is set for the retrieved searcher. Additionally, the server may determine 772 whether an anonymous flag is set for the user, or whether the server has personally identifying information for the user. If the anonymous flag is set for either the user or the searcher, then the system establishes an anonymous communication channel 774 between the user and the searcher.

If neither the user nor the searcher has an anonymous flag set, then the server 118 (FIG. 1) may establish 776 (FIG. 5A) a communication channel between the user and the searcher that includes identification information of the user and/or the searcher. This identification information could be, by way of example, a city, a state, a country, a street address, an occupation, a legal name, a screen name, a number used for identification, an e-mail address, a telephone number, a VoIP telephone identification, etc. As will be understood by those of ordinary skill in the art, the disclosed system provides for the storage of many types of identifying information for both a user and a searcher, and the system may be configured to provide as much or as little of that information as the respective party desires to disclose.

Having the system facilitate a dialog between a searcher and a user through these operations may allow a user to receive a higher quality and more rewarding search experience. The dialog allows the user to guide the searcher so that a better search result may be produced. The dialog is preferably conducted through the server 118 (FIG. 1) or, alternatively, by a mechanism such as instant messaging directly between two computers, telephones, or devices (or using a different server than the one provided by this service). The dialog may also occur via mechanisms such as VoIP, circuit-switched voice networks, or voice packet networks.

When the end of a billing period is reached, the server may access the database 156 (FIG. 2) to obtain information associated with the success of the searchers (e.g., relevance of the results to the end user), the number of advertisements, advertisements selected by the searcher, the speed of response, etc. and applies a formula that may take these factors into account in order to compute a remuneration for a searcher. The server may also apply a formula to compute the advertising cost for the advertisement (paid by the advertiser) that can take into account the number of times an advertisement has been presented, the length of time a user watched the ad, whether a user "clicked-through" the ad, whether a user bought products and/or services from the advertiser's website (this information may be delivered back to the server from the advertiser), etc. Appropriate payments to searchers and bills to advertisers can then be sent out. Searchers may receive their payment via an "account" on the system until a searcher asks for a payout, which might occur via any form of payment, or a searcher may chose to spend their credits, points, and/or dollars, etc. on products that may be offered via the search tool system.

Figure 6:
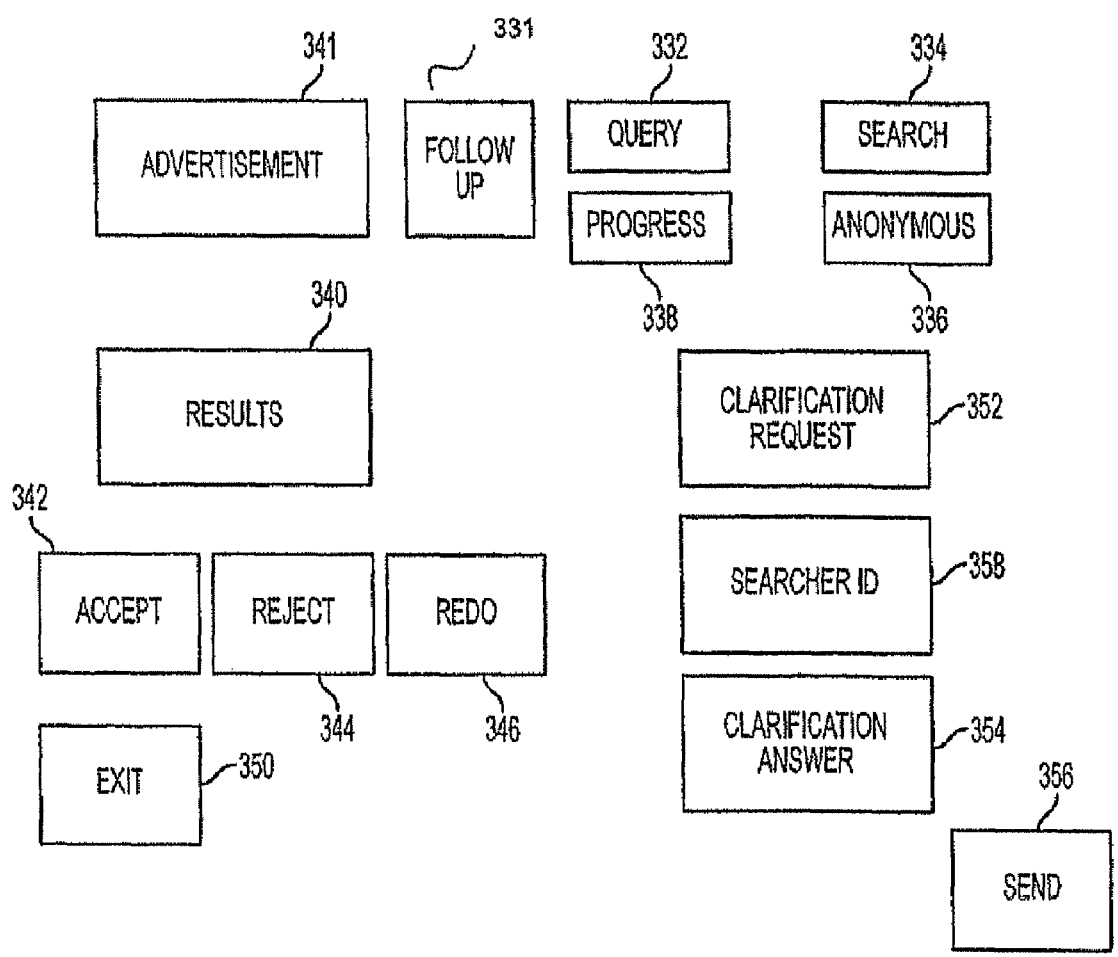
FIG. 6 is an exemplary user or requester graphical user interface (GUI).

A user system, such as computer system 102 (FIG. 1), presents the user with a graphical user interface (GUI) the basic components of which are depicted in the GUI 330 in FIG. 6 while FIGS. 9A through 9E show possible layouts of other components of a GUI and examples of usage. The components of the GUI 330 (FIG. 6) include a frame (or field/window) for a query 332 and a control or button 334 to start a search. A user can also activate a button 336 to signify that he or she does not want to remain anonymous to a searcher, which prompts the user to login or to setup an account (register) so that logins are possible. The registration process allows a user to enter or otherwise make available data that can be used to generate default attributes (location, preferred default search engine, eye color, dress size, shoe size, etc.) for qualifying keywords of a search query. A progress frame 338 (FIG. 6) can be displayed to show a user information of the progress of a search and a follow up frame 331 may be provided to send and receive data regarding searches which have been deferred or are pending for results. A results frame 340 displays the results of the search and buttons may be provided to accept 342, reject 344 or redo 346 the search. The text of the redo button 346 may say "Click here if you are not pleased and want to repeat your search with a new searcher" and/or the buttons 342 and/or 344 may be eliminated. The accept, reject and redo input indications available to the user may be implemented in various action buttons without modifying the basic functionality.

An information frame 341 can also be provided for displaying information, such as an advertisement, provided to the user during a search and/or the results frame 340 may be used for the presentation of information (e.g., an advertisement). An exit button 350 may also be provided which can result in log-off from the search system. If a searcher requests clarification, the request may be presented in clarification request frame 352 and the user can enter clarification in the clarification answer frame 354. The user may send the clarification by activating a send button 356 or by simply hitting "enter" on a PC keyboard, as would be done with a chat session. The searcher identification may also appear in searcher ID frame 358. Alternatively, both the user's and searcher's comments may appear in the same frame, similar to the way many chat services are structured, designating each person's comments via a tag which could be their real identity, a user ID, or a temporary ID, etc.

The GUI 330 has an associated GUI data structure or database (not shown) that stores the contents of each of the buttons and frames or fields. For example, the data structure may store a flag indicating whether a user is anonymous, whether a search has been requested, the contents of the clarification request frame, the contents of the results frame, etc. This local user system GUI data structure is mirrored in the database 156 (FIG. 2) of the server 118 (FIG. 1) and when the database in the server is updated, the content of the user system GUI data structure and GUI can also be updated. The entire contents or any subset of the GUI data structure can be transmitted to the server 118 (FIG. 1) any time a user activates a button and the server responds with an update to the GUI data structure (and GUI).

The entire contents of the GUI data structure may also be updated when events occur at the server, such as when an advertisement is to be displayed, the status of a search changes, the status of a searcher changes, etc. Alternatively and preferably, to keep a user GUI simple, the system may only provide the frames and buttons, as they are needed. For example, until a clarification request is made, the GUI need not display the frames 352 or 354 (FIG. 6) and button 356. To minimize any visual overload that may be presented by the GUI and keep the presentation to a user simple when they first come to the website, only the query frame 332 and the search button 334 may be initially presented to the user along with a minimal amount of text such as the title of a company (also see FIG. 9A). Once a user has entered a query, other frames may appear on the display such as an advertisement 341, progress indication 338, and the chat or clarification elements 352, 358, 354, 356 (also see FIG. 9B). When the results are sent back, the results frame 340 may open and either share space on the display with or take the place of, an advertisement. The buttons such as 342, 344, 346 might appear along with the results (also see FIG. 9C). The exit button 350 and the identify (or login or "anonymous") button 336 may be displayed for the user, depending on the service implementation.

Figure 7:
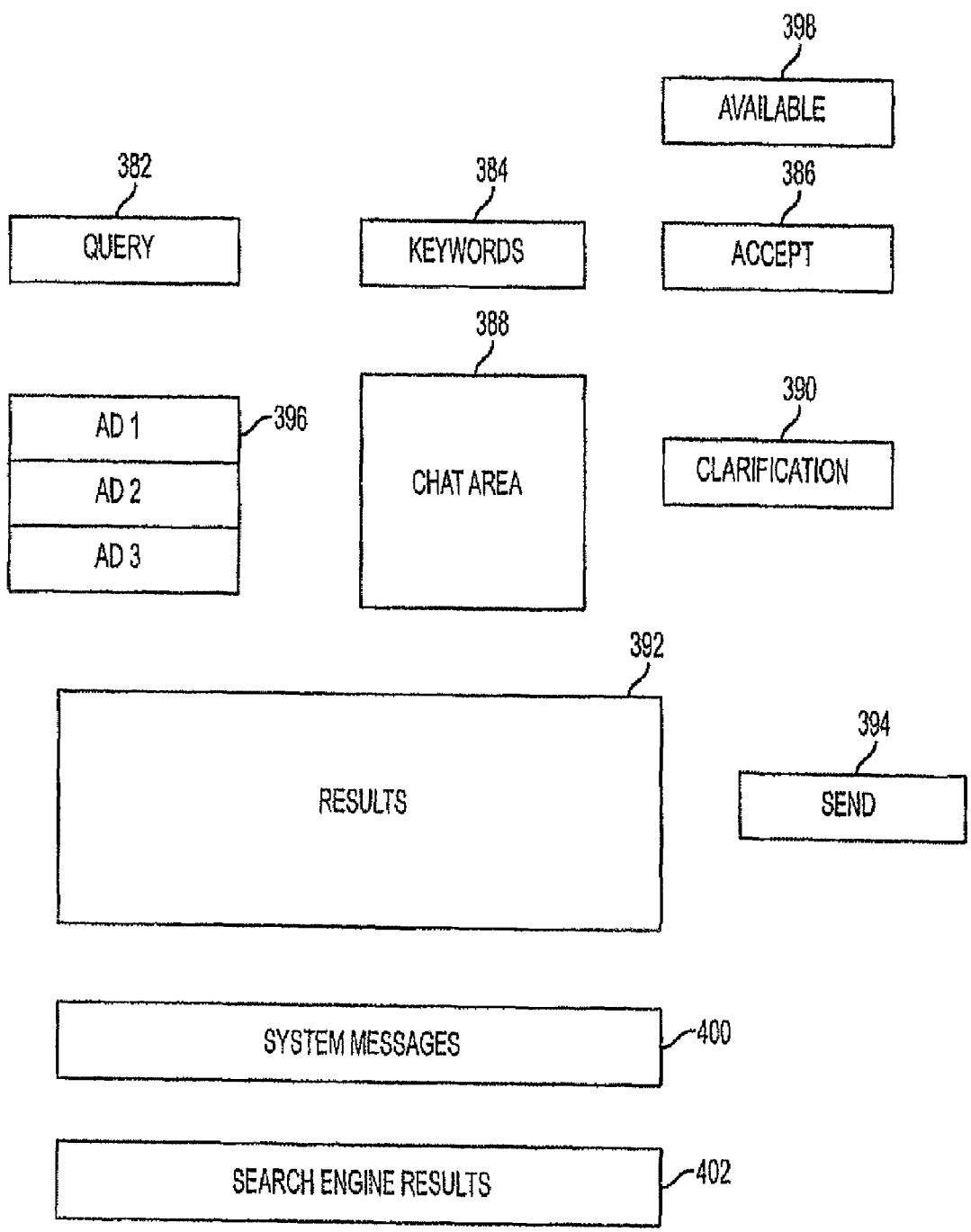
FIG. 7 is an exemplary searcher or provider GUI.

A searcher tool system (e.g., searcher tool system 122 (FIG. 1)) may incorporate a more sophisticated GUI 380 (FIG. 7) and associated data structure. The components of the GUI 380 are depicted in FIG. 7 while a possible layout of the basic components shown and others are depicted in FIGS. 10A through 10E. The GUI 380 (FIG. 7) may allow a searcher to review a query in a query frame 382, accept the query via an accept button 386, request clarification via a chat area 388 of the display and a clarification button 390 to send a message to get clarification from the user. A searcher can also drag/drop/paste search results with text, pages, links etc. into a search results area 392 send the results via a send button 394, select or designate an appropriate advertisement for a query from an advertisement list 396 that can be correlated to keywords presented in frame 384 and/or results presented in frame 392. A searcher can also indicate availability ("logged-in and accepting queries" or not) via the available button 398 and receive information in the system messages frame 400 such as, "other searchers have accepted this query", the status of results from other search engine(s) or website(s) to which the query has been passed, the statistics of the searcher such as success rate, keywords associated with the searcher in the database 156 (FIG. 2), etc.

The GUI 380 (FIG. 7) may also show the results of a conventional search engine(s) search in frame 402. Other buttons or display frames can include a request to transfer the query or a clarified or searcher-rewritten query, an indication that a received query has been transferred, activate a speech-enabled search capability so that cellular phone users (and other speech-oriented users of the system) may access the speech-enabled searchers, and send voice messages to users, etc. using appropriate frames and button controls. The GUI 380 (FIG. 7) could also be updated any time the searcher activated a button and any time the server 118 (FIG. 1) updated database 156 (FIG. 2) entries associated with the searcher GUI 380 (FIG. 7). The server 118 (FIG. 1) or the client side system such as searcher tool systems 122 and/or 124 (FIG. 1) may control the GUI 380 (FIG. 7) using a variety of implementation platforms including Flash®, Flex™, J2EE®, XML, AJAX, Ruby, etc. The GUI may have bookmarks, etc. for a searcher's favorite tools, databases, often used results, other public or private resources, etc.

The GUI 380 (FIG. 7) may provide sections of the screen that automatically fill with results of the query being passed to other search engines or websites and return results in those frames (or separate windows) without a searcher needing to copy and/or re-enter the query. A searcher may interact with any search engine(s) or website(s) independently until the searcher finds information that is highly relevant, which may then be selected, copied, and pasted into the results window 392. Once the collection of data is accumulated in the results window, it may be sent to the user's "results" window or frame. This may be accomplished by copying the data over the network from the searcher's results frame (or window) 392 (FIG. 7) to the user's results frame (or window) 340 (FIG. 6), which may need to be opened (and an advertising frame or window may be closed simultaneously).

Alternatively, selected areas of the information being searched may be dragged and dropped to the results window by a mechanism similar to selecting a Google® listing (or other search engine's listing) in Windows® Internet Explorer® and dragging the listing paragraph to another application such as Microsoft® Word and dropping it there to have it inserted. A similar mechanism could be used to drag a selected listing paragraph from search engine results frame 402 (FIG. 7) and drop the selected information into results frame 392.

Alternatively, an HTML and/or XML source interpreter may be implemented which interprets the source of the website or information that is being accessed and treats the selected area of the display as an object comprised of tagged sub-objects that can be intelligently accessed by other applications. Each distinct search engine, website, or other source of information may need its own form of translation in order to identify the sub-components of the information that will be sent via the searcher's results frame to the user's results frame. Tagged information might include elements such as title, description, URL, etc.

The searcher results frame 392 (FIG. 7) and user results frame 340 (FIG. 6) could be filled with links that look similar to those of current search engines when results are exchanged. Alternatively, actual text, graphics, audio, video, or other information files may be returned by dragging and dropping to a results frame, similar to what is accomplished with operating systems such as Windows® where files may be copied by dragging and dropping to another location.

The user-facing part of the system preferably operates as a web application through a browser on a personal computer on devices such as the user computer system 102 (FIG. 1) or as a voice application through an interactive voice response system. Typically, this would be a thin client, getting most or all of its data via a web page server, which can be a component of the server 118. The server might be one monolithic computer or it could be a distributed network of computers that slice up the processing of webpage serving, ad serving, query and results search, database accesses, etc. Alternatively, the user-facing portion of the system may be a standalone application or a part of a standalone application (e.g., implemented through an SDK).

The searcher-facing portion of the system may also be implemented as a browser-based thin client that allows all of the significant processing, data flow, various information source connections, and data manipulation to occur at the server 118. However, preferably, because of scaling issues (i.e., handling very large volumes of users who each may require searchers to be checking many sources per user), it is preferable to implement the searcher-facing portion of the system via a locally dynamic application that might run standalone or might run in the context of a browser. There are many examples of locally dynamic applications that do significant processing on the client side (in this case, searcher side, such as systems 122 and 126) while relying on data structures that exist on a server (in this case, the server 118 which houses the database 156 (FIG. 2)). Some examples of locally dynamic applications include Google® Earth (web-based mapping software), implemented using AJAX (Asynchronous Java combined with XML), and Basecamp® (web-based project management software), implemented using "Ruby on Rails™".

The user- and searcher-facing parts of the system may be implemented using these various mechanisms, but the heart of the system is in its database 156, which is preferably resident at the query server 118 (FIG. 1), which itself may be one or many computers working in harmony to implement various data structures. FIG. 8 shows the relationships of the data structure types. Primary data structure types are implemented for the user, the searcher, the keyword, the query, the advertisement, the category, and the chat session. Within these primary structures, there are pointing relationships to the other types. In this system, data structures are comprised of single instances and/or lists of these data types. For example, each user is associated with a user data structure, which may have local data such as IP address, start time, personal information, GPS info and demographics while also having pointers to the query that the user has made, a list of advertisements that the user has seen or is scheduled to see, the chat session between the user and a searcher (or searchers), a link to the current searcher, and a list of favorite searchers that might be prioritized for this user in the future.

Similarly, the query structure may have local data such as the query text and results as well as pointers to keywords associated with the query, and a chat session associated with the query. Other relational connections are presented in FIG. 8 showing various data types of the database 156.

One example of the framework that may be used to implement the functionality includes having the searcher-facing part of the system implemented as a WinForm application using .NET Framework 2.0 using C# with embedded Flash® 8.0 elements for capabilities such as the chat session portion of the interface. The database may be implemented using SQL Server™ 2000, 2005 or another server with similar features. The database may also be implemented using data structures such as pointers in a custom application, or using a database application such as Oracle®, MySQL®, Sybase®, or the like. The user-facing part of the system can be a Windows® Internet Explorer® running on a PC with the Flash® 8 Plug-In. Alternatively, the searcher-facing and/or the user-facing part of the system may be implemented as JavaScript®, as a Java® application, as an ASP application, or the like, in conjunction with a browser such as Firefox®, Opera®, Safari™, Mozilla®, or the like.

One feature of the disclosed system is that information that is located on a searcher's hard drive, intranet, or local environment may be searched, for example using automated desktop search engines offered by Google® and others and/or via manual searching in a directory of a hard drive or on a local network. When relevant information is found using this method, the searcher may select, drag, and drop information from this "local" source, but the referenced document must be copied first to a publicly-available website, which is readily available via companies such as GoDaddy.com® and others. When a searcher sets up his or her configuration, a public website (and login credentials) may be identified to the searcher tool so that local data may be searched, copied to the public website, and referenced in the results with a link to this publicly available website. Alternatively, the search system itself may make files publicly available, on behalf of a searcher, at the server 118 (FIG. 1), at a searcher tool system, such as searcher tool system 122, or elsewhere.

Files may be automatically transferred using a File Transfer Protocol (FTP) by the searcher tool system 122 to a public site, wherever it is located. A reference pointer (i.e., URL) given to a user via the results 484, 486 (FIG. 9C) will be to the material which has been copied to the public website where the searcher has permission to store documents (of any form such as text, images, audio, video, etc.).

This function of accessing the "Deep Web" (i.e., the very large volume of documents and information that is not commonly available via the most popular search engines today) is accomplished by allowing a broad base of searchers associated with keywords to have the ability to include materials that are not readily indexed via traditional search engines (e.g., Google®, Yahoo!®, MSN®, Ask Jeeves®, Dogpile®, or others).

Searchers who sign-up for particular keywords are preferably motivated to collect excellent resources in order to provide relevant answers quickly to users. This may include increasing a searcher's points and/or rank so that they may be compensated at a higher rate. Searchers may be self-motivated to provide excellent results because they have had a medical experience themselves and would like to help others in need of timely information about the same issue. Searchers may have a passion for a hobby that motivates them to make themselves available to help others in real-time regarding that hobby.

The database 156 (FIG. 2) may include entries and a pointer-based structure such as those depicted in FIG. 8. This data structure or database 156 may include cross-linked entries for query, keyword, searcher, user, results, advertisement, categories, and chat session. Within these structures may be included entries for logged-in status of searcher (availability), rank (or weighting) of searcher, rank (or weighting) of keyword, searcher statistics such as number of searches, number of accepted (by user) searches, user identification (and/or IP address of user), name, address, demographics about users and/or searchers, search results, advertisements (game, video, text, audio, etc.), advertisement statistics, accounting information, anonymity flags for users and/or searchers, searcher availability, query clarification and request (and/or chat session log), an indication as to whether a searcher is available for general searches, query follow-on, etc. The statistics for a searcher may include the total number of searches, the number of successful searches, the average speed of the searcher, the latency of the searcher before starting and ending a search, the average number of results returned by the searcher, the availability time of the searcher, etc.

During a search sequence as depicted in FIGS. 9A through 9E, when a user first accesses the search system web site, the user may be presented with a query GUI 460 (FIG. 9A) in the browser window 461. This GUI 460 includes a frame 462 where the user can enter a query, keywords, etc. (that can be similar to what might be entered at the Google® or Ask Jeeves® websites). Additionally, a drop-down button 463 may activate a drop-down list 465 that contains one or more of the user's previous queries (if any exist). These previous queries may be identified because, even though a user may be anonymous to the server 118 (FIG. 1), a cookie may be stored on the user computer, such as user computer system 102 (FIG. 1), that may contain a UID for the user, so that the server 118 can identify the past activities of the user, even if no personally identifying information is known about the user. This further allows the user to connect with a searcher (or searchers) associated with a previous query, as described below.

A user may select a previous search, which may cause the browser window to be loaded with a previous query GUI 498 (FIG. 9D), described below. The PAQs may be provided to the GUI 460 (FIG. 9A) by the server 118 (FIG. 1), as described in relation to FIG. 2. If one of the PAQs has been updated, there may be a symbol, such as an exclamation point, after the PAQ text. Alternatively, the word "updated" may appear after the PAQ text. Additionally, the GUI 460 (FIG. 9A) may include an indication of "You Have A Message!", to indicate that a searcher has left a message for this user. In this case, the GUI 460 may include a read button 469 that takes the user to a message board, chat room, e-mail account, instant message and/or other window(s) to allow the user to read and/or respond to the message or messages.

The GUI 460 also includes a search button 464 that may be activated when the user is ready to perform a search on a query. The query GUI 460 may also include controls 466 and 468 that may highlight when the cursor passes over them and that when activated ("clicked-on") may connect a user to a page(s) that provides information on becoming an advertiser and becoming a paid searcher, respectively.

Figure 9A:
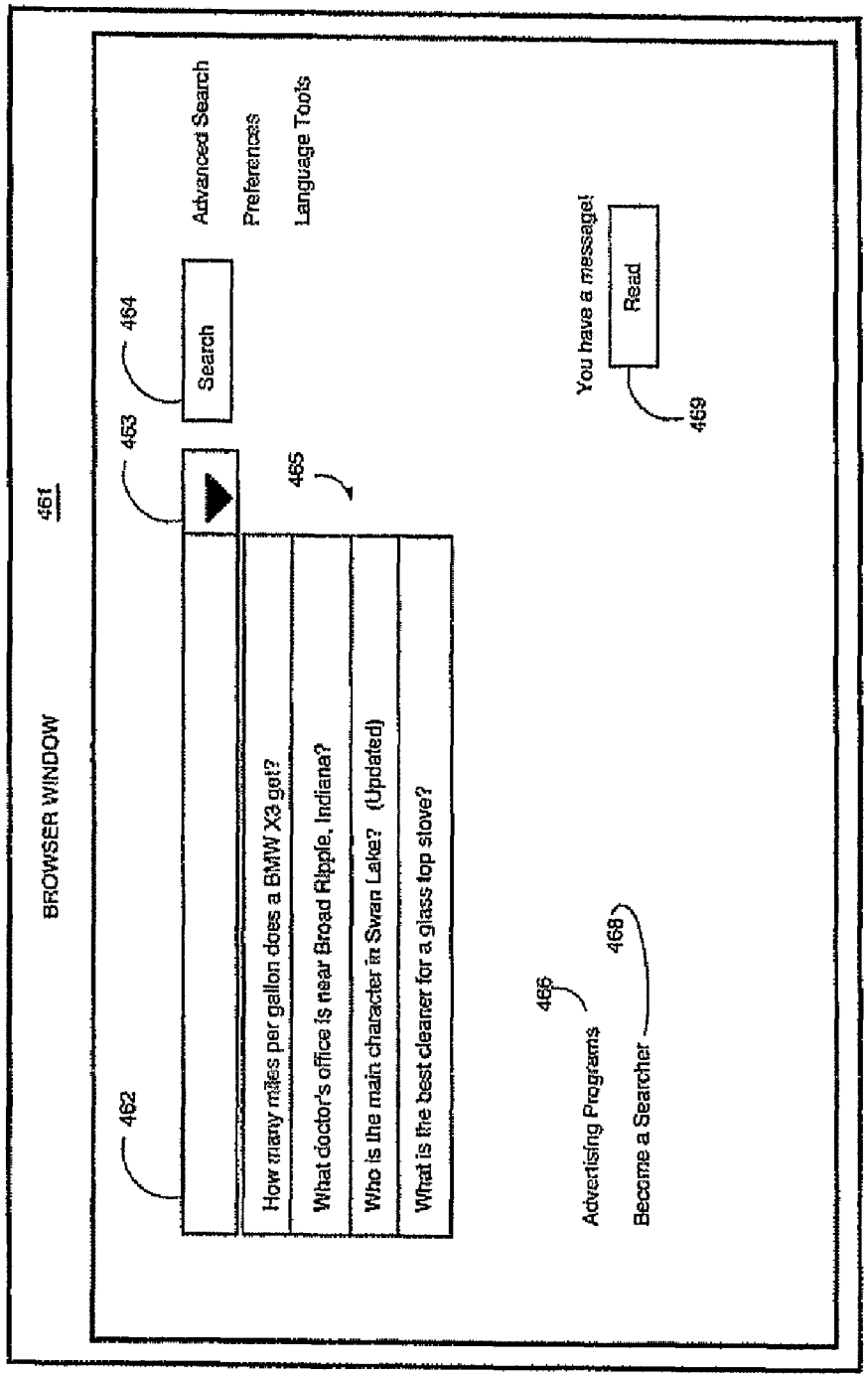
FIGS. 9A-9E illustrate elements of an exemplary requester GUI.
Figure 9B:
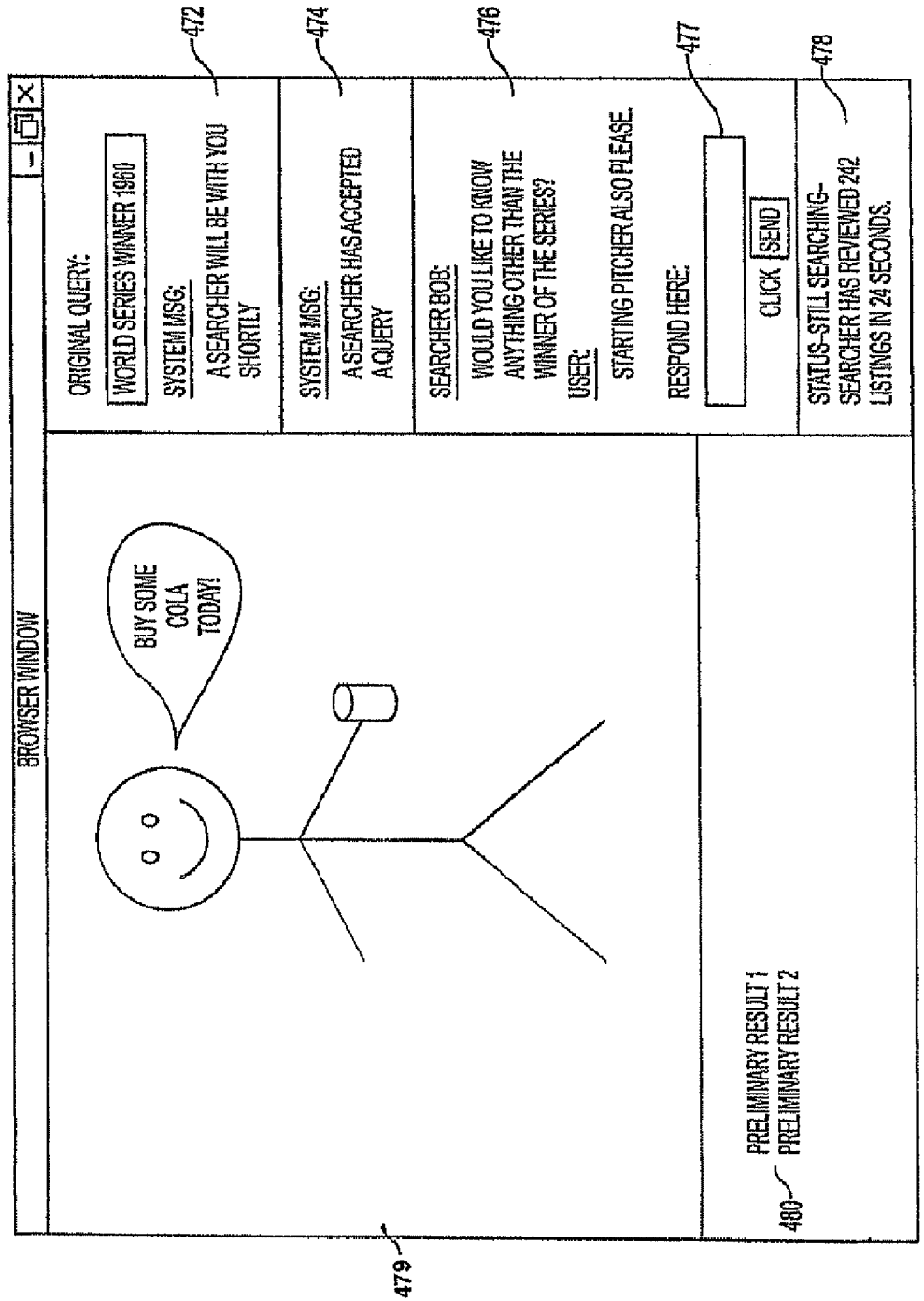
Figure 9C:
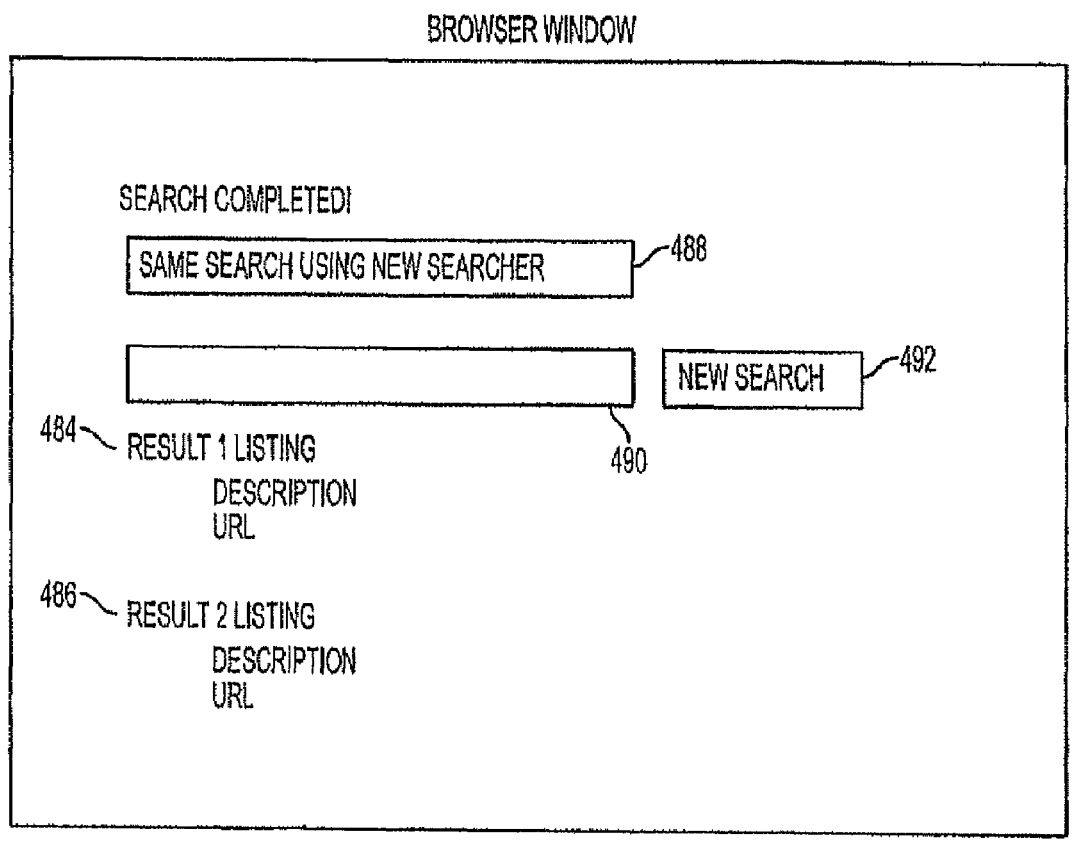

After a user initiates a search with the button 464 (FIG. 9A), the browser window may be loaded with a search GUI 470 (FIG. 9B). This GUI 470 includes a frame 472 where a user may be presented a message that indicates searcher status. The user is may also be presented with an advertisement(s) in advertisement frame 479 (FIG. 9B). There may be a variety of formats of advertisements. There may be multiple advertisements on the page. When a searcher accepts a query, a message 474 indicates that a searcher has been assigned and when the searcher is not anonymous, the name of the searcher may be presented in the chat frame 476, perhaps with the searcher asking a clarifying question. Items that are typed by the user in entry box 477 may show up in the chat frame 476. A status frame 478 is updated with the status and progress of the search. When results become available, even though they may be preliminary, the results can be presented in frame 480.

When a search is completed, the user may be presented with a search results GUI 482 (FIG. 9C), that may include one or more search results 484 and 486 that may include text descriptions, URLs, etc. If a user is not satisfied with a search the user can request a new search by activating "same search using new searcher" button 488. The user may also be able to start a new search by entering a new query in frame 490 and activating the new search button 492.

Figure 9D:
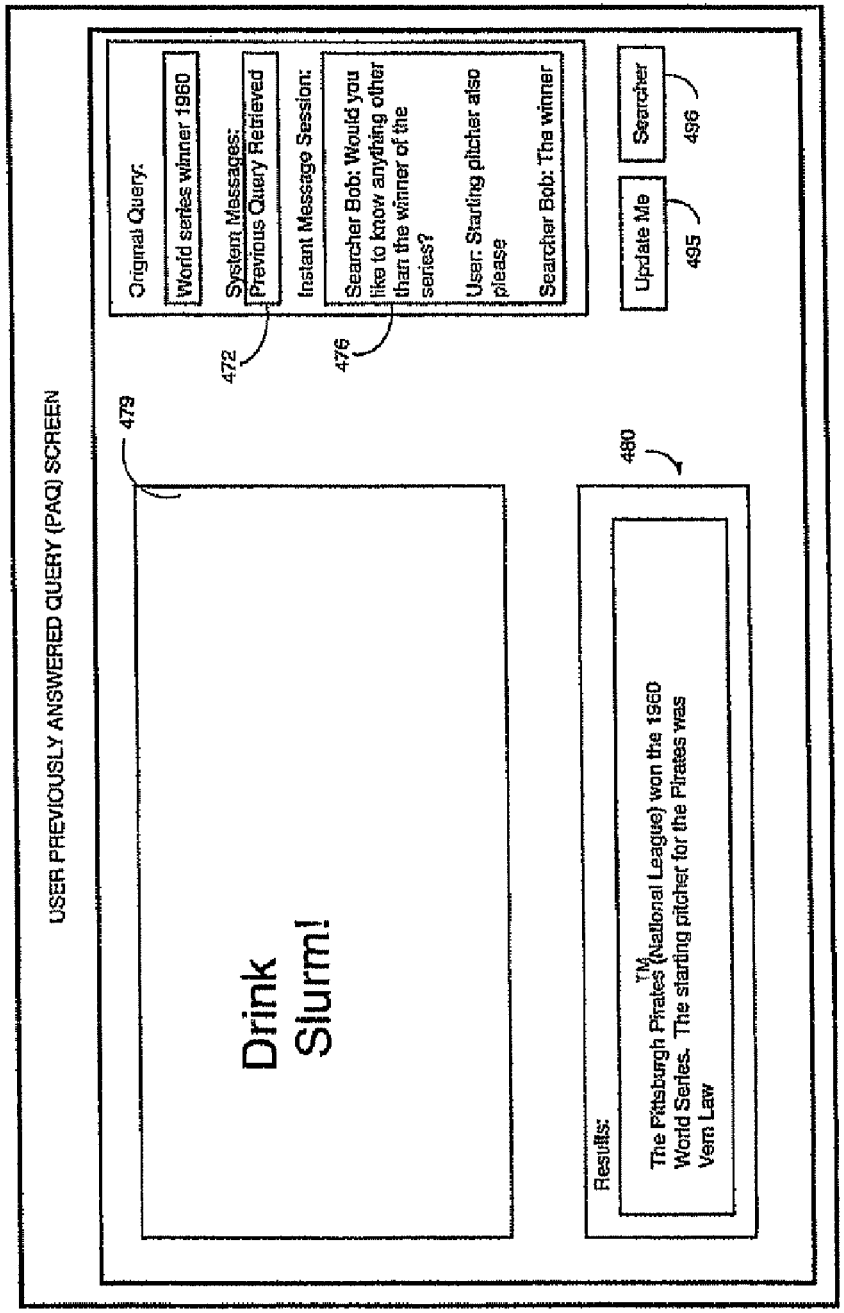
Figure 9E:
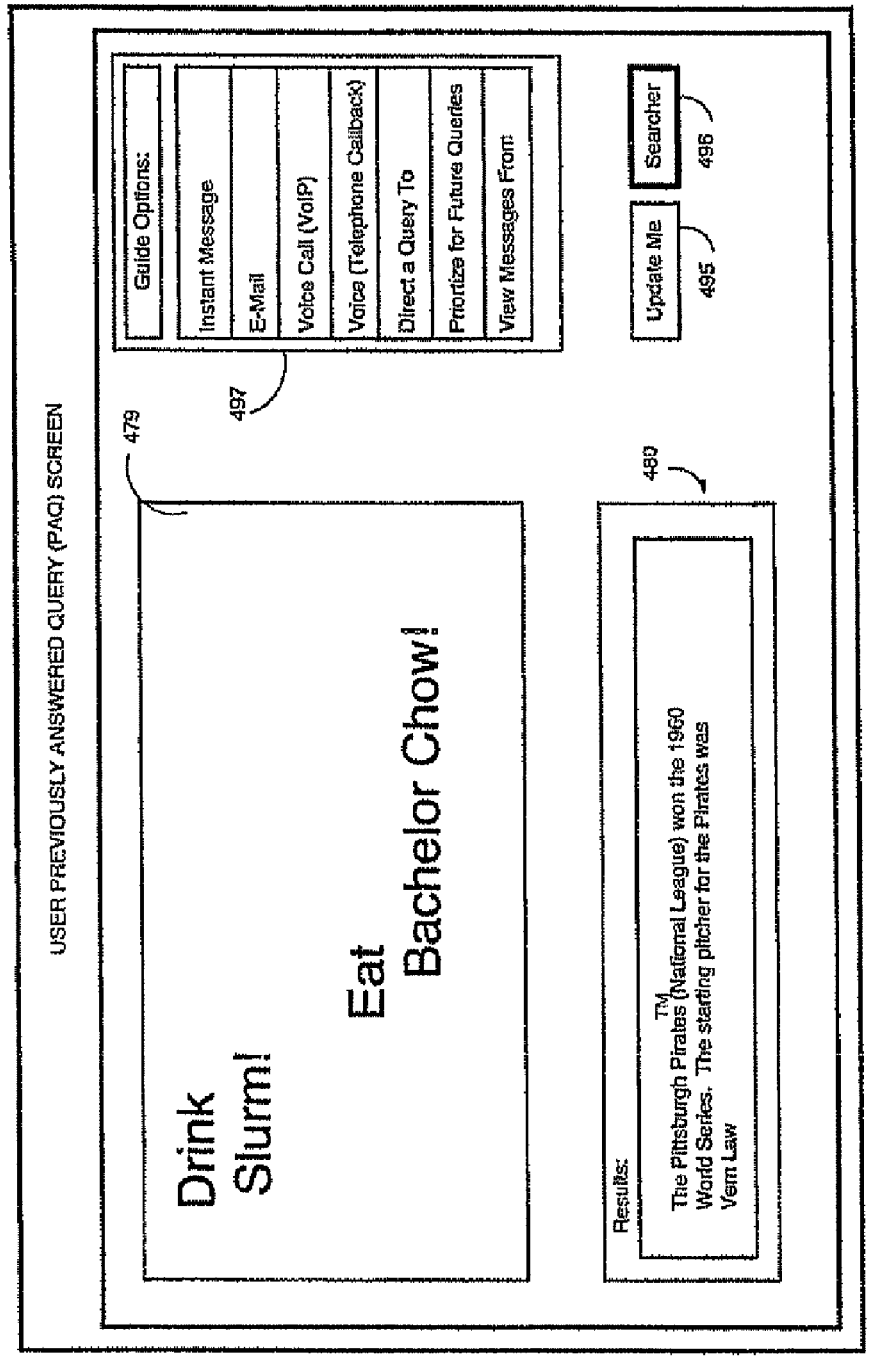

When a user selects a previous query from the drop-down list 465 in query GUI 460 (FIG. 9A), the browser window may load the PAQ query GUI 498 (FIG. 9D). The GUI 498 may include a frame 472 where the user may be presented a message that indicates that the selected previous query is being retrieved from the database 156 (FIG. 2). The user may also be presented an advertisement in advertisement frame 479 (FIG. 9D). There may be a variety of formats of advertisements. There may be multiple advertisements on the page (see FIG. 9E). When the previous query result has been retrieved from the database 156 (FIG. 2), a message so indicates, and the previous conversation with the original searcher may be included in the chat frame 476 (FIG. 9D). The original search results, and any updated and/or appended search results for this PAQ, may be presented in frame 480.

The user PAQ query GUI 498 (FIGS. 9D and 9E) may also include an "update me" button 495, and a searcher button 496. If a user selects the update button 495, then a flag may be set in the database 156 (FIG. 2) indicating that this user wishes to be updated in an event that the results to this query are, for example, changed, appended, edited, or become expired. When a user selects the searcher button 496 (FIGS. 9D and 9E), the user PAQ GUI 498 (FIG. 9E) can be modified to include a searcher options selection box 497. For example, for any given searcher, the user may be able to initiate a message session, to e-mail the searcher, to initiate a voice call via voice over IP (VoIP) with the searcher, to initiate a voice call via telephone call back with this searcher, or the like. Additionally, via GUI 498 the user may direct a new query to the searcher or prioritize this searcher for future query(ies), for example, queries including the same key phrases, or for all queries. Additionally, the user may be able to select an option to view messages from this searcher, if any exist.

As described above in FIG. 5A, the follow-up communications between a user and a searcher may be completely anonymous, such that neither has any identifying information regarding the other, other than the information contained in the previous query in which they participated. Because the server 118 (FIG. 1) contains a database 156 (FIG. 2) that has a unique identification for both the user, and the searcher, the server 118 (FIG. 1) may establish a communication session between the searcher and the user, while maintaining total anonymity between the searcher the user. For example, telephone calls, and voice over IP calls may be routed through the server 118 such that either party only can determine the telephone number of the server 118. Similarly, e-mail messages, chat messages, and instant messages may be passed between the user and the searcher in total anonymity by filtering the messages through the server 118.

Figure 10A:
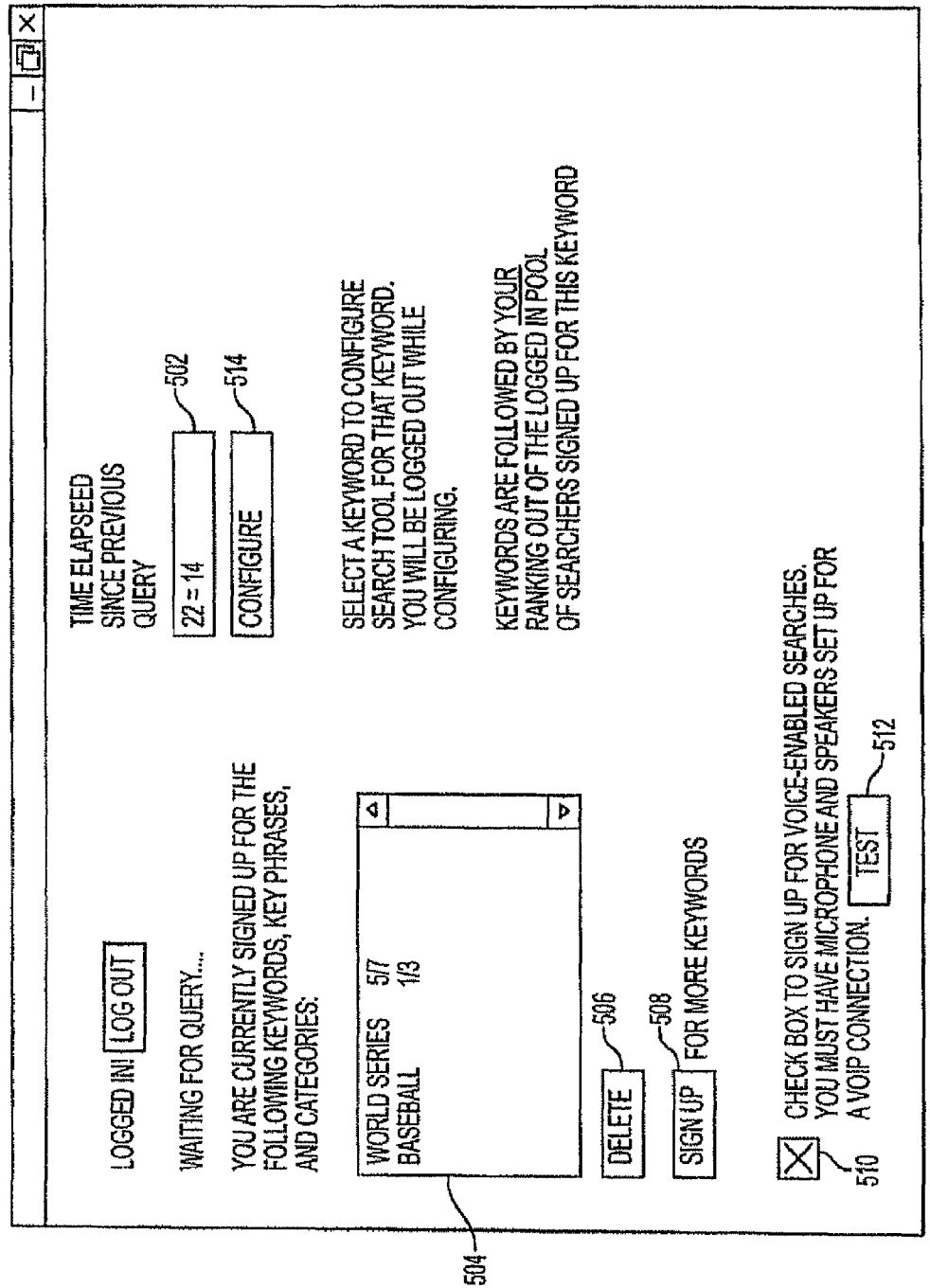
FIGS. 10A-10G illustrate elements of an exemplary provider GUI.

FIG. 10A illustrates an example of a searcher login screen 500 which a searcher may see after invoking an application but before being engaged in an actual search session. The screen 500 includes frames 502 for an elapsed time since the previous query, a frame 504 that can show a searcher a list of keywords for which the searcher has registered to do searches. (During the first invocation of this application, a searcher is preferably offered an online tutorial that teaches how to sign-up for keywords using this application as well as tips about what keywords might be good choices). Preferably, a searcher signs up for a short list (e.g., three) of keywords initially until the searcher proves that he or she provides timely and/or relevant results (which will result in a higher ranking for the searcher).

A searcher may sign-up for more keywords by logging in and pressing the sign-up button 508. Keywords would then be listed in frame 504 showing not only the keyword but also the searcher ranking for the particular keyword (e.g.'"5/7" means that there are seven searchers who are logged-in and who have signed-up for this same keyword. Of those seven, this searcher is ranked fifth). A delete button 506 may allow the searcher to delete any highlighted keywords from the searcher keyword list. The sign-up button 508 may allow the searcher to sign-up for additional keywords, preferably by opening up a new screen (see FIG. 10E as well as the description below). The searcher can sign-up for voice based searches using a check box 510 (FIG. 10A). A test button 512 may allow for testing of the voice components (speakers, microphone, etc.) needed for a voice query (see also FIG. 10B). A configure button 514 allows a user to obtain a screen for configuring the searcher tool (see FIG. 10C).

Figure 10B:
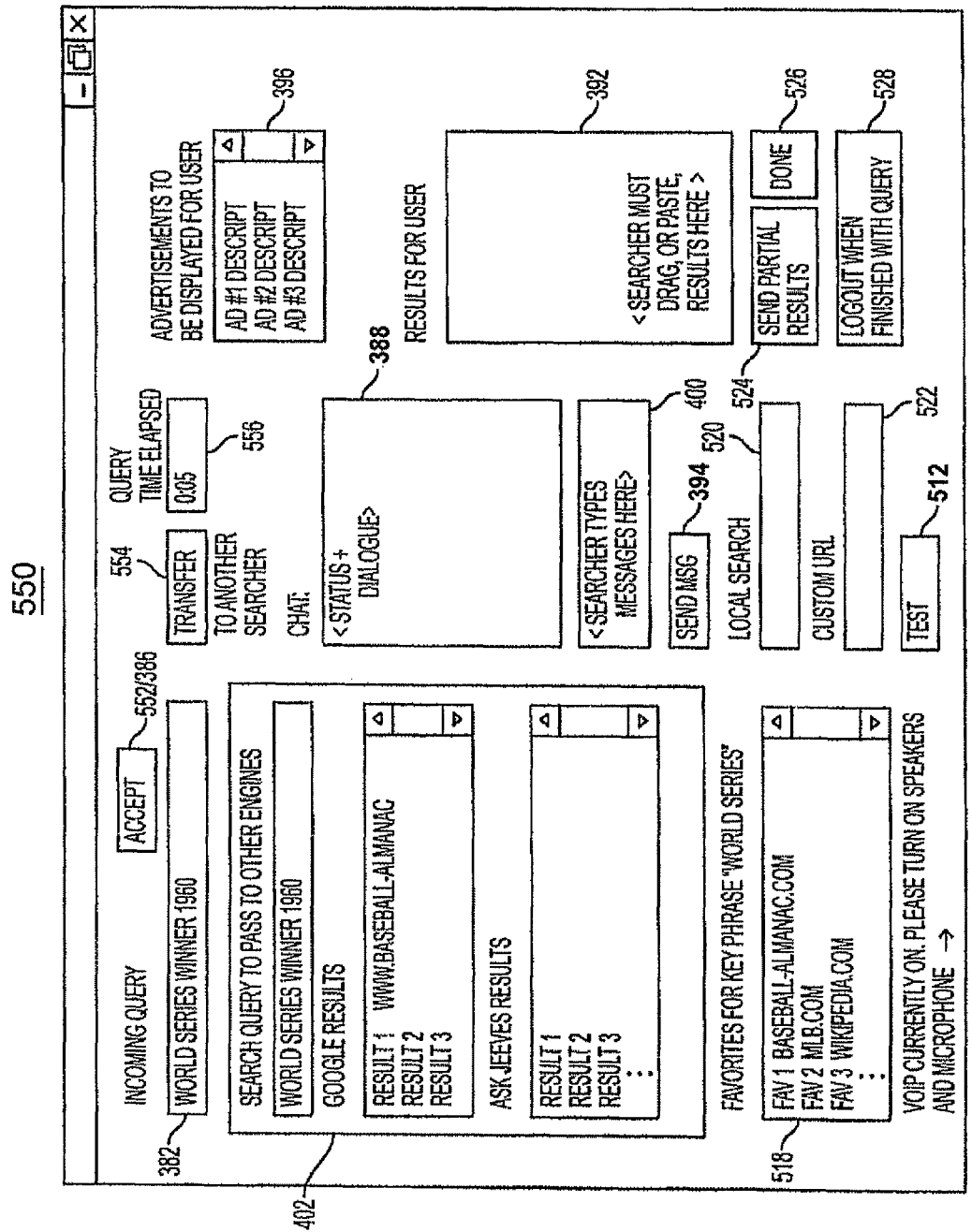

FIG. 10B shows the query receipt screen 550 with the example query about the World Series previously mentioned, having been received by a searcher in query frame 382. The third party search engine results for the query are shown in frame 402. A searcher's preferred third party search engine(s) may be chosen by the searcher (see FIG. 10C). A frame 518 (FIG. 10B) may be provided that shows the searcher's favorite websites associated with a keyword that was used to select the searcher. A searcher may select favorite websites in advance (see FIG. 10C). A local search frame 520 (FIG. 10B) may be provided allowing a searcher to check his or her own local hard drive or intranet to find relevant information related to a user's query, or search through his or her previously answered queries (PAQs) (see FIG. 10F). A frame 522 (FIG. 10B) for a custom URL where a searcher may enter any URL to be able to access the entire web in order to find relevant results on behalf of a user may be provided. A searcher can send partial search results or final results via buttons 524 and 526, respectively, and log out via button 528. If a searcher accepts the query, button 552 may be selected. A searcher may choose to transfer the query to another searcher using button 554 (also see FIG. 10D). The query time elapsed may be displayed in frame 556 showing the searcher how long this query has been "live".

Figure 10C:
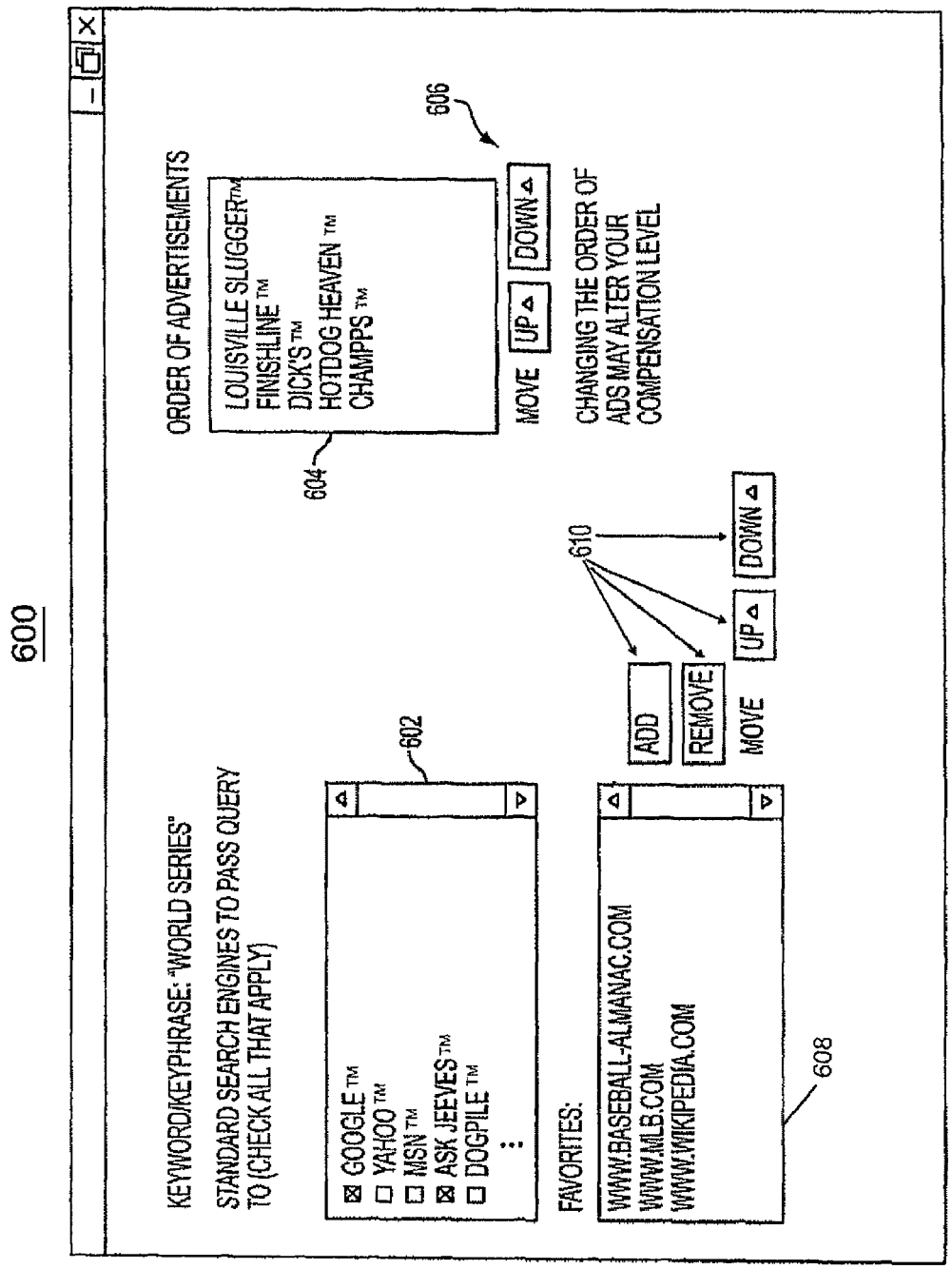

FIG. 10C shows the searcher configure screen 600 that may be used to configure the searcher tool for a keyword(s). This screen is reached by "clicking on" the configure button 514 on searcher tool screen 500 (see FIG. 1A). A searcher can specify which search engines are used in frame 602 (FIG. 10C) and the sequencing of the advertisements in frame 604 using up/down sequence buttons 606. A searcher's favorite website (s) for finding information about a keyword can be listed in frame 608 and the listings can be sequenced up/down and websites may be added or removed using buttons 610.

Figure 10D:
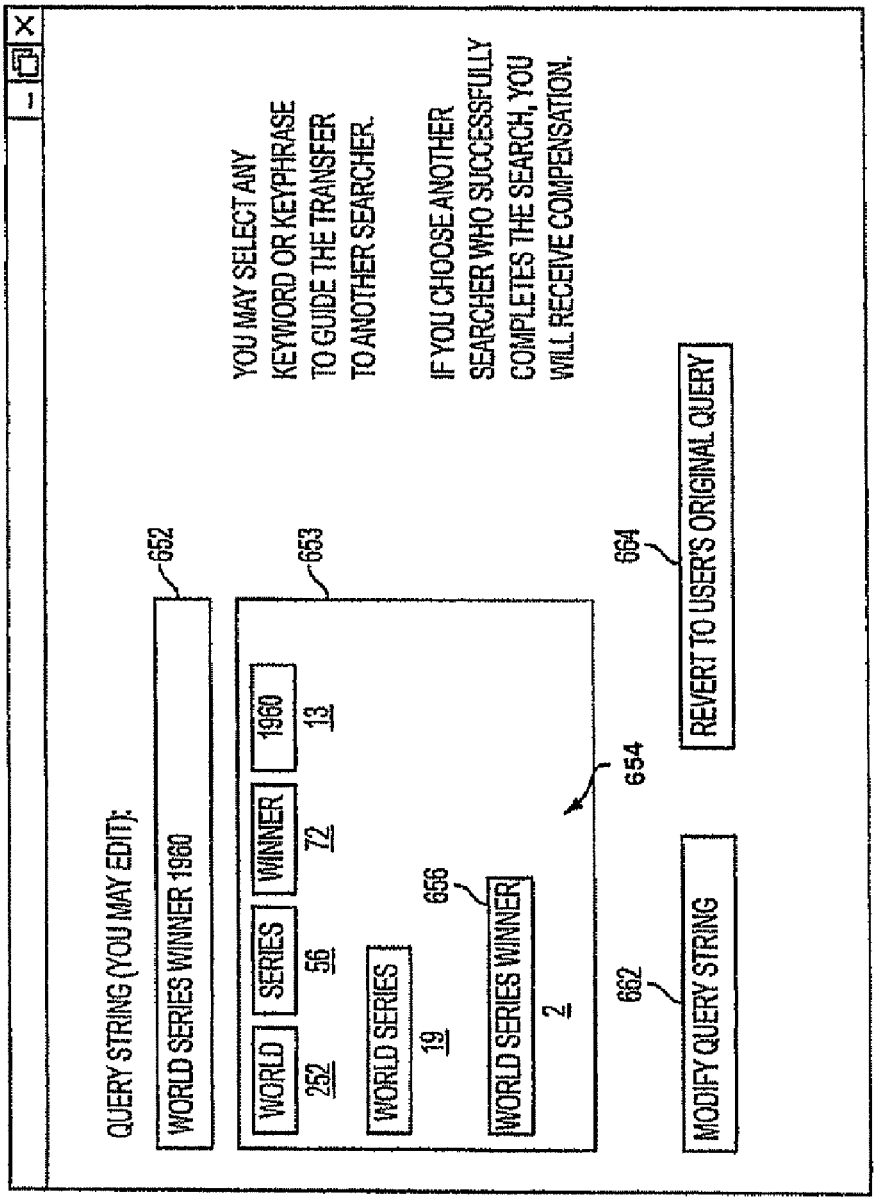

FIG. 10D illustrates the screen 650 used to transfer a query to another searcher. The query is shown in frame 652 while the various component keywords 654 of the query are displayed in frame 653. Below each component keyword, the number of active searchers for the keywords/phrases of the query is shown. Buttons 662, 664 may also be provided that may allow a searcher to change the query, which will result in new component keywords, etc. A searcher may cause a transfer to occur by selecting the keyword button 656 (FIG. 10D) that may result in a more successful set of results being returned for this query. A searcher may be compensated for transferring a query to a searcher that provides a successful result to the user.

Figure 10E:
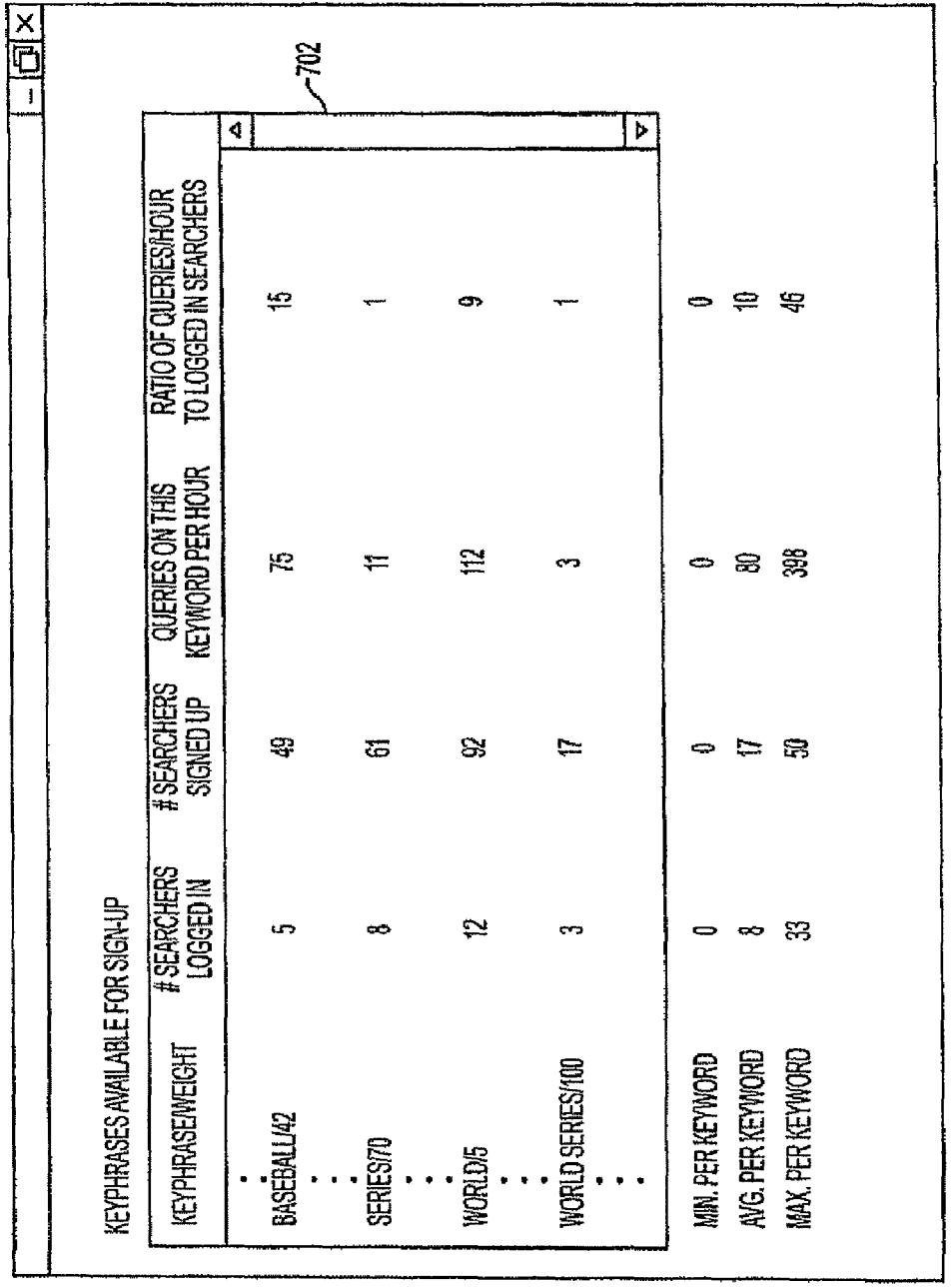

FIG. 10E shows a screen 700 used by a searcher to sign-up or register for keywords. Available keywords are listed in frame 702. "Available keywords" may include any known keywords, or during the system startup phase when searchers are just beginning to sign-up, the list may be a controlled subset of keywords. For example, the system might start with only the 500 most popular keywords used in searches by the general population. Or the system might offer keywords in a particular category such as medicine or sports. The frame 702 shows keywords and their weight that indicates the "strength" of a keyword when found in a search query phrase. The number of searchers signed-up and logged-in for the keywords are also shown. The number of queries in the last hour (or alternatively, last day, week, or any other period of time) for the keyword is shown along with the ratio of queries to logged-in searchers. This data may allow a searcher to choose keywords that will result in the searcher being able to be selected for more search queries and possibly achieve higher ranking. Providing this level of detail may create "efficiency" in the system, similar to what might be found on the trading floor of a stock market. Other ranking data for keywords may be made available as deemed appropriate by system administrator(s) of the system 100 (FIG. 1).

Figure 10F:
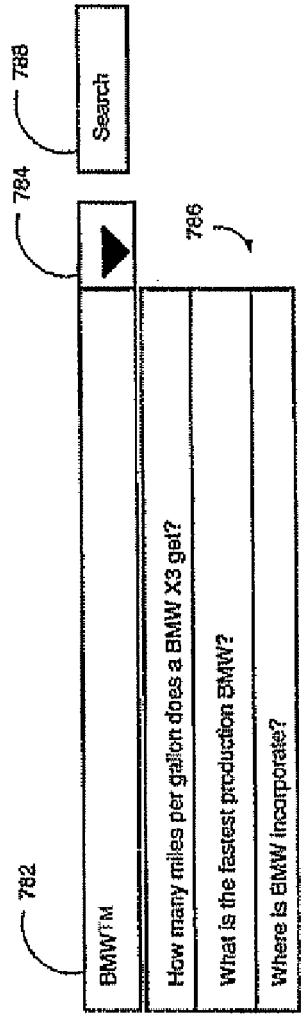

FIG. 10F shows a screen 780 that can be used by a searcher to access the searcher's PAQs. A searcher may enter a particular search term in the frame 782. For example, the searcher may wish to retrieve all PAQs where the query included the keyword "BMW". After entering such a keyword, the searcher may activate the search button 788. Upon activating the search button 788, a drop down list 786 of PAQs answered by the searcher containing that keyword(s) may be displayed.

Alternatively, if the searcher desires to see his most recent PAQs, or possibly all of his PAQs, the searcher may activate the button 784, which may display such a drop down list. Upon selecting one of the PAQs from the drop down list 786, the graphical user interface 790 (FIG. 10G) may be displayed to the searcher.

Figure 10G:
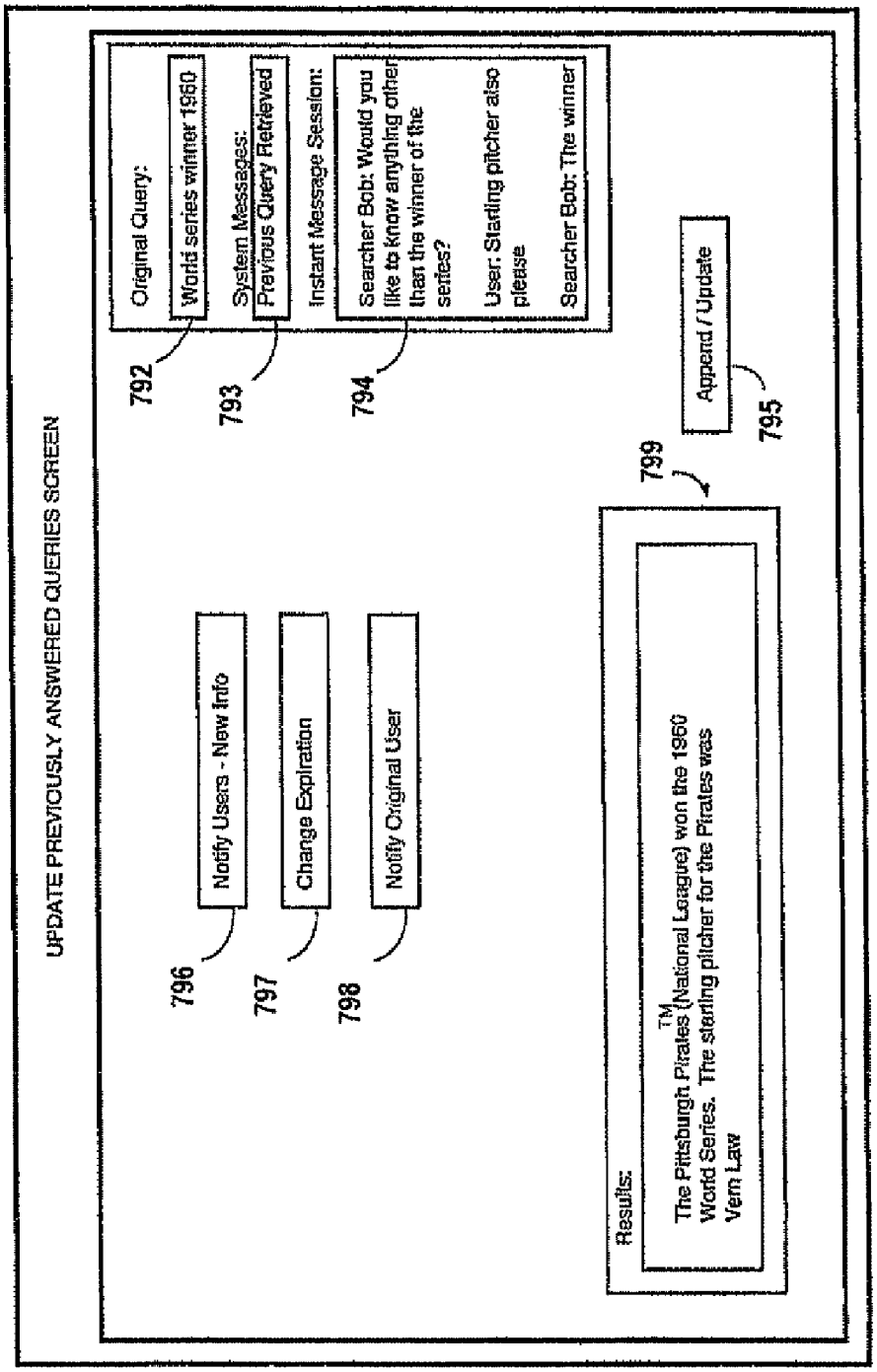

The GUI 790 includes a frame 792 that includes the original query, and a frame 799 that displays the original, and optionally the amended or edited, results. While the system is retrieving the PAQ, a system message frame 793 may indicate that the PAQ is being retrieved, and later may indicate that it has been retrieved. Additionally, a searcher may view a communication session associated with this PAQ in frame 794 (FIG. 10G). An append/update button 795 may be provided to permit a searcher to amend, and/or update the results of this PAQ. Additionally, a "change expiration" button 797 may allow a searcher to change the expiration date for a result. For example, if the result were timely information, a searcher may know that the result is no longer valid, and choose to expire it. If a searcher changes the expiration date of, appends, or updates the results for the PAQ, then the searcher may choose to notify either the user who originally posed this query, and/or every user that has viewed this query.

In order to notify only the original user, the searcher may select the "notify original user" button 798. In order to notify all users who have viewed this query, the searcher may select the "notify users—new info" button 796. As described previously, if a query is updated, users viewing that result as a PAQ may either receive a message, or may see an indication in their drop down list of PAQs indicating that the PAQ has changed, or expired. These controls may be implemented as pop-ups or other functionalities as well.

If a searcher discovers information that appears to satisfy a user's query, such as a passage in a book on the searcher's personal bookshelf, the passage and possibly surrounding contextual material can be scanned in and posted on the searcher's public web site (as described earlier), assuming copyright laws are adhered to. The searcher can then provide the user with the passage of interest and a link to the website scanned version, possibly a link to a neighborhood library that includes a copy of the book, and/or possibly a link to a bookseller's website (e.g., Amazon®) where the book may be purchased. The search system can then add this information to the database so it may be accessible to the searcher for future searches and to users for whom the searcher is searching. A desktop search capability may be installed as part of the searcher tool installation, which may be a local application running on the PC, a browser-based application, or server-based application that presents its information via a web-browser. Google® Desktop Search is one such example.

To facilitate having searches performed by searchers who are experienced in searching the subject matter of the queries, the searchers, when they initially register as a searcher in the system, select keywords or categories of keywords that indicate their search expertise and/or experience (see FIG. 10E). The set of keywords selected by a searcher may be updated as a searcher obtains a wider field of experience or simply becomes more accustomed to using this system. The system remunerates searchers for successful searches (e.g., which the user views as relevant and useful) and, as a result, it is expected that various searchers with a wide variety of search expertise will be logged-in (available) to provide coverage at all times. Remuneration may be based on advertising revenue thereby providing an incentive to searchers to provide satisfactory results and, when given the option, to select advertisement(s) relevant to the search query, hopefully maximizing advertising revenues.

In addition, the remuneration may be based on the proportion of successful searches (user accepted search results) and this provides the searchers an incentive not to accept searches that are outside their field of search "expertise". Or, if a searcher determines that he or she is not "qualified" to deliver a satisfactory result, the searcher should be motivated to transfer the query to another searcher who may be able to deliver a satisfactory result. If a query is transferred, the searcher may receive some compensation if the next searcher delivers a satisfactory result to the end users thereby motivating the original searcher to carefully transfer the request (see FIG. 10D). The amount of compensation may also be based on how quickly a searcher determines that a transfer is appropriate.

This system may also provide motivation for a searcher to only sign-up for keywords for which he or she can provide a satisfactory response to a user in a timely fashion. A searcher need not be an expert in the subject matter of a query but is expected to be capable of locating information relevant to the query. The disclosed system will most likely work the best when the system has a large number of searchers that are available 24 hours a day, providing coverage regarding anywhere from a thousand (at system startup) to hundreds of thousands (or even millions) of keywords (a system that has evolved to have sufficient searchers to cover the large number of keywords). To help insure that such a mass of searchers sign-up to be paid searchers, the system may split the advertisement revenue with the searchers based on a formula as previously discussed.

The system may also provide a different or additional reward to searchers based on their relevance ranking. The relevance ranking may include one or more factors, such as average search speed, number of user accepted searches performed, number of searches performed, amount of cumulative time answering queries regarding a particular keyword, number of keywords that they search, etc. In one embodiment the system may provide a reward that rewards the best searchers, is graduated, rewards a large number of people, rewards a few with a very large reward, attracts media attention, engenders discussions among users and searchers of the system with other associates and contacts, can cause many searchers to compete to be the best, provides incentive for searchers to sign-up for keywords for which they can be particularly successful, and provides incentive for searchers to be logged-in (available) as often as possible.

One example of such a reward system is a reward pyramid that gives a few searchers a very large reward while many searchers receive some reward. This mechanism can be used to convince a large number of people to sign up as paid searchers. Such a pyramid might pay $1 million to the top searcher during a period, $100,000 to the ten next best searchers, $10,000 to the hundred next best searchers, $1,000 to the thousand next best searchers, and $100 to the next best 10,000 searchers. This particular bonus system involves 11,111 people. The reward may be issued on a yearly, quarterly, monthly, weekly, or daily basis.

An alternative embodiment involves having a "PC anywhere" (remote control) or WebEx® (remote meetings) type of experience for a user who does not directly control the search screen but can watch what a searcher is doing to accomplish his or her task. This allows a user to be entertained, occupied, and engaged by what a searcher is doing.

A user may comment in a "chat" frame in ways that allow for a search to be accomplished more collaboratively. For example, during a search about the winner of the 1960 World Series, a user could say via the chat screen (while watching what the searcher is referencing): "What I really wanted to know was who was pitching for the winning team in that game". The searcher could comply with the clarified request.

Figure 11:
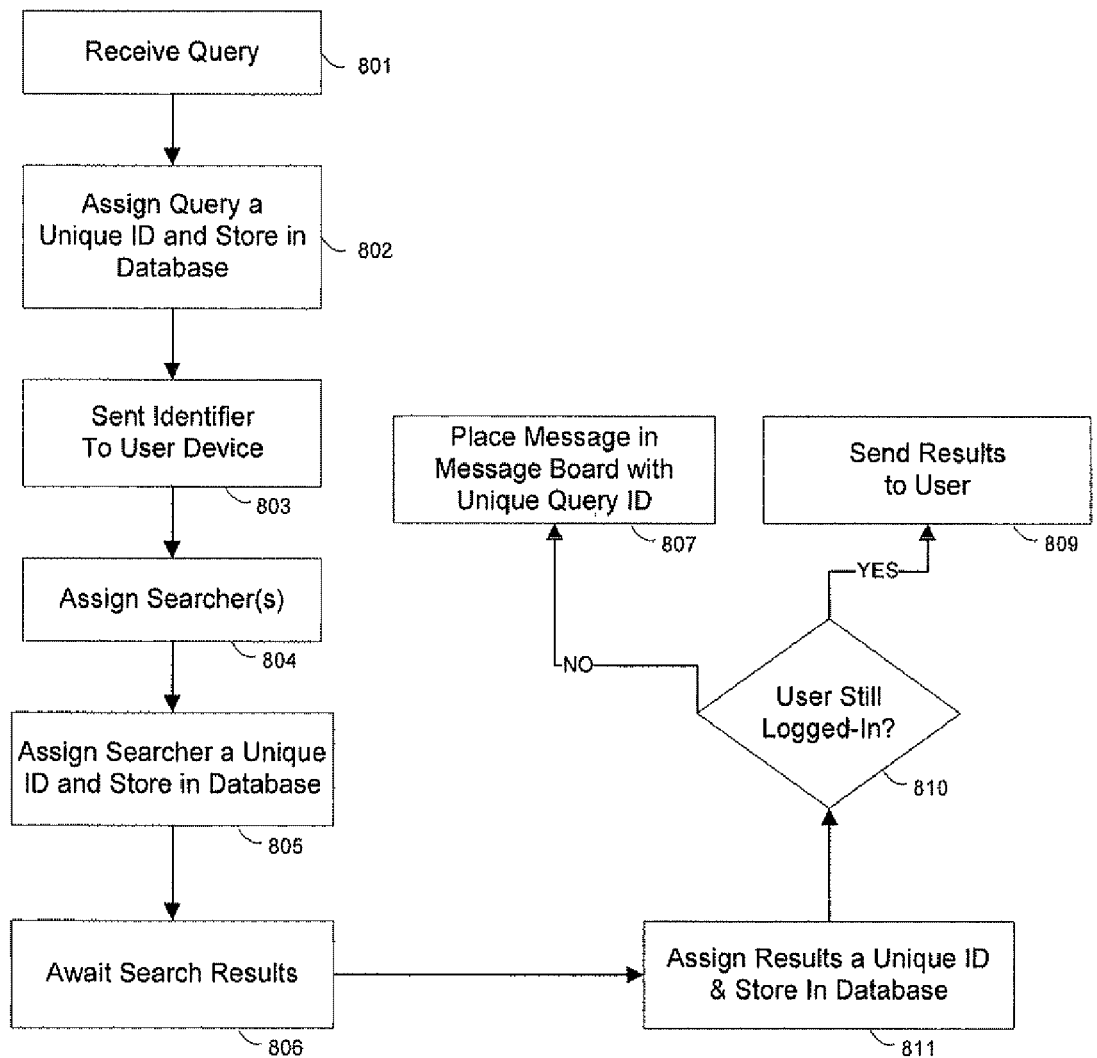
FIG. 11 is an exemplary flowchart for providing anonymous communication between a user and a searcher.

FIG. 11 illustrates process 800 for providing anonymous communication between a user and a searcher. As shown in FIG. 11, process 800 begins when a query is received 801. As mentioned above, a query may be a fully-formed question, keyword(s) or a search phrase, or any other type of query. After receiving 801 the query, process 800 moves to assigning 802 the query a unique identification (ID) and storing the unique ID and the query in the database 156 (FIG. 2). For example, as discussed above, a UID may be randomly generated based on a date of receipt of the query, IP address of the user submitting the query, etc.

Subsequent to assigning 802 (FIG. 11) and storing the query and the unique ID, process 800 continues to sending 803 an identifier (e.g., a cookie) to the user's device (e.g., computer system 102 (FIG. 1)). For example, a short text may be delivered to and stored on the user's computer for tracking when the user connects to the server 118 (FIG. 1). In the case where a user is connected to the system via a method which involves a user-specific identification, such as caller ID or IM credentials, the information may be associated with the UID of the user in the database 156 (FIG. 2).

After the identifier has been sent 803 (FIG. 11) to the user's device, a searcher (or searchers) is assigned 804 to handle the received query. If the server 118 (FIG. 1) receives a request, the server 118 may determine which of the registered searcher(s) that are currently available are suitable to handle the query. For example, each available searcher registered to handle queries pertaining to the category "health" may be identified and ranked against other searchers registered for the category according to prior success in responding to queries to assign the query to top ranked available searcher(s) within the category. Various types of factors may be used to assign one or more searchers to a query received. Further, any criteria discussed in U.S. patent application Ser. No. 11/336,928, titled A SCALABLE SEARCH SYSTEM USING HUMAN SEARCHERS, inventor Scott A. Jones, filed Jan. 23, 2006 may be used. The server 118 may process search requests or queries by determining which searcher(s) (providers or guides) are available to search for information being requested in a query received, based upon factors such as searchers that are logged in, searcher(s) who are signed-up for a keyword or category, the ranking of searchers based on previous performance, etc.

Subsequent to assigning 804 (FIG. 11) a searcher (or searchers), process 800 continues to assigning 805 a searcher a unique ID and storing the query in association with the unique ID in the database 156 (FIG. 2) and then search results are awaited 806 (FIG. 11). As mentioned above, a searcher may use various resources including search engines to conduct a search and generate search result(s) in response to the received query. After the search result(s) has been generated, each result(s) are assigned 811 a unique ID and stored in association with the query in the database 156 (FIG. 2).

After a unique ID is assigned 811 (FIG. 11) to the result(s) generated by a searcher, process 800 continues to determine 810 whether a user is still logged-in. When determining that the user is still logged in, results are sent 809 to the user. When determining that the user is no longer logged in, process 800 places 807 a message having the results in a message board database of results to be accessible to the user upon next login.

Figure 12:
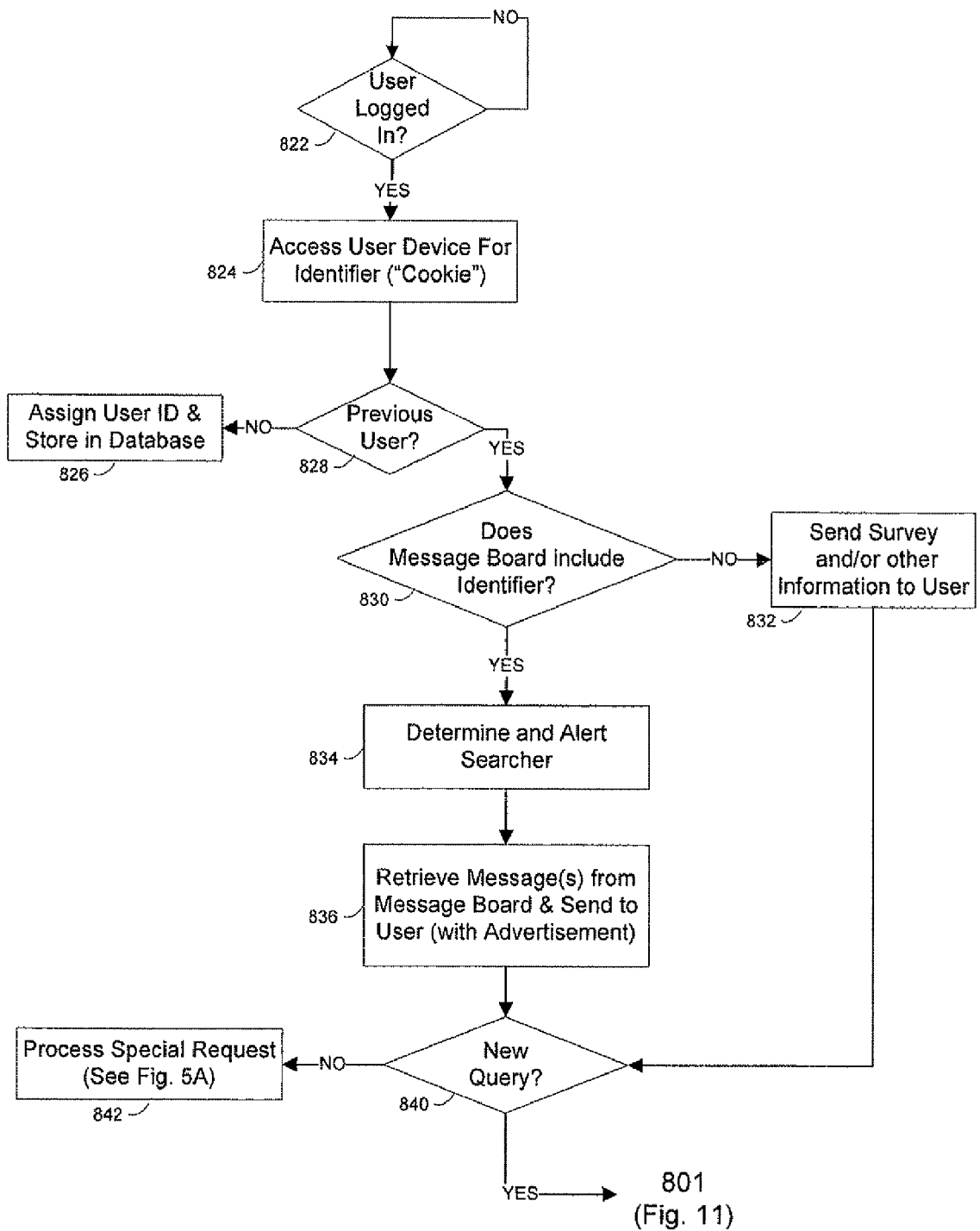
FIG. 12 is an exemplary flowchart for sending a message from a searcher to a user.

An exemplary process 820 for sending a message from a searcher to a user is illustrated in FIG. 12. As shown in FIG. 12, process 820 begins with determining 822 whether a user is logged-in. For example, presence data such as that provided by instant messaging, account information such as a unique ID assigned to a user, cellular phone availability status, etc. may be used to determine whether a user is logged into the server 118 (FIG. 1).

Subsequent to determining 822 (FIG. 12) that a user is logged-in, process 820 continues by accessing 824 a device of the user for an identifier. For example, a cookie stored on the computer of a user may be accessed to identify transaction(s) specific to the user. Although a cookie stored on the computer of a user is illustrated as an identifier in relation to process 820, the method and system disclosed are not limited to use of a cookie as an identifier. For example, an IP address assigned to a computer may be used as an identifier for identifying the computer of a user, or other device ID information such as caller ID, IM credentials, or other information can be used.

After accessing 824 the user device, process 820 continues determining 828 whether the user is a previous user. Upon determining 828 that the user is not a previous user, process 820 continues by assigning 826 a user ID and storing the user ID in the database 156 (FIG. 2). When determining 828 (FIG. 12) that the user is a previous user, process 820 continues to determine 830 whether a message board table in the database 156 (FIG. 2) includes an identifier of the user.

When determining that the message board table does not include an identifier of the user, process 820 (FIG. 12) moves to sending 832 a survey and/or other information to the user and determining 840 whether there is a new query. For example, information requesting input of a user regarding the search system, advertisements, etc., may be sent to the user. When determining that the message board table includes an identifier of the user, process 820 continues to determining 834 and alerting a searcher. For example, a searcher who has previously handled a query for the user may be identified and sent an e-mail, an instant message, etc.

Subsequent to determining 834 and alerting a searcher, process 820 continues to retrieving 836 message(s) from the message board database or table and sending the message(s) to the user which may include an advertisement(s). For example, a message may be posted on a message board regarding an update related to a result provided in response to a previous query of a user.

After retrieving 836 (FIG. 12) message(s) and sending the message(s) to a user, process 820 continues to determining 840 whether there is a new query. When determining 840 that there is a new query, process 820 continues to process 800 (FIG. 11). When determining 840 (FIG. 12) that there is no new query, process 820 moves to processing 842 special request including contacting searcher(s), sending additional results, etc., as discussed in detail in relation to FIG. 5A.

Accordingly, a system and method are disclosed for establishing communication between a user and a searcher based on anonymously stored query of the user and responses to the query from the searcher(s). The system disclosed assigns randomly-generated unique system IDs to the user, the query, the searcher and the response(s) to the query, and utilizes a user ID and a searcher ID that are preferably used consistently.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, failing within the scope of the claimed invention.

What is claimed is:

1. A method, comprising:
   assigning an identifier to a human searcher in receipt of a first query from a user;
   associating an identifier assigned to the user and the identifier assigned to the human searcher with a unique identifier of the first query;
   providing an unique indicator of a search result of the human searcher in receipt of the first query to the user during an initial session;
   receiving a second query from the user subsequent to the initial session and providing a stored answer to the user in response to the second query;
   selecting the searcher to perform a search responsive to the second query when the user activates the indicator of the search result and rejects the stored answer provided responsive to the second query; and
   conducting an anonymous communication between the searcher and the user using the identifier of the first query to establish a follow-up session that is subsequent to the initial session.

2. The method of claim 1, further comprising:
   receiving a previous query request from the user during a second communication session, and presenting the first query, the identifier of the first query and the search result to the user for selection of the searcher to perform a search during the second communication session, wherein the previous query request includes the identifier of the first query.

3. The method of claim 1, further comprising:
   providing information of the first query and the search result to the user; and
   transferring the first query to the searcher responsive to a selection for said transferring by the user subsequent to a review of a search result of a second searcher by the user.

4. The method of claim 2, wherein the searcher conducts the search and provides a response to the user during the second communication session.

5. The method of claim 1, comprising:
   assigning the unique identifier to the human searcher including generating the unique identifier based on a random number; and
   selecting the searcher when determining that the searcher is a highest ranking searcher for the second query, the ranking being adjusted when determining that the user has selected the indicator of the search result.

6. The method of claim 1, wherein assigning the unique identifier to the user comprises generating the unique identifier based on a random number.

7. The method of claim 1, wherein assigning the unique identifier to the query comprises generating the unique identifier based on a random number.

8. The method of claim 1, further comprising determining whether the first query has been previously searched, and providing previous search results responsive to the determining.

9. The method of claim 1, further comprising:
   receiving a request for previously searched queries from the user during a second communication session, and presenting the first query and the search result to the user during the second communication session, wherein the request for previously searched queries includes the unique identifier of the user; and
   notifying the searcher of the second query in an order based on a ranking of the searcher for a keyword of the first query and a ranking of the keyword for the second query.

10. The method of claim 1, further comprising receiving a request for previously searched queries from the user during a second communication session, and presenting the second query and corresponding search results to the searcher during the second communication session, wherein the request for the previously searched queries includes the unique identifier of the user.

11. The method of claim 1, further comprising:
   receiving a request for previously searched queries from the searcher during a second communication session, and presenting the first query and the search result to the searcher during the second communication session, wherein the request for the previously searched queries includes the unique identifier of the searcher.

12. The method of claim 11, further comprising establishing the second communication session between the searcher and the user.

13. The method of claim 1, further comprising:
receiving a request for previously searched queries from a second user during a second communication session, and
presenting the first query and the search result to said second user during the second communication session, wherein the previously searched queries includes the first query and selecting the searcher based on a ranking of the searcher for the second query and decreasing the ranking of the searcher for a search request of the second user when determining that the second user has rejected the search result.

14. The method of claim 13, further comprising establishing an anonymous communication session between said second user and the searcher.

15. The method of claim 1, further comprising storing the unique identifier of the user on a device associated with the user during the initial communication session.

16. The method of claim 15, further comprising retrieving the unique identifier of the user from the device associated with the user during a second communication session, reading the unique identifier of the first query from a database based on the association between the unique identifier of the user and the unique identifier of the first query, and presenting the first query and the search result to the user during the second communication session.

17. The method of claim 16, further comprising reading the unique identifier of the searcher from the database based on the association between the unique identifier of the searcher and the unique identifier of the first query, and establishing an anonymous communication channel between the user and the searcher.

18. The method of claim 15, further comprising associating the unique identifier of the searcher with the unique identifier of the user in a database during the initial communication session, retrieving the unique identifier of the user from the device associated with the user during a second communication session, reading the unique identifier of the searcher from the database based on the association between the unique identifier of the user and the unique identifier of the searcher and presenting the first query and the search result to the searcher during the second communication session.

19. The method of claim 15, further comprising associating the unique identifier of the searcher with the unique identifier of the user in a database during the initial communication session, retrieving the unique identifier of the user from the device associated with the user during a second communication session, reading the unique identifier of the searcher from the database based on the association between the unique identifier of the user and the unique identifier of the searcher, and establishing an anonymous communication channel between the user and the searcher.

20. A system, comprising:
a user system including a unique user identifier, in communication with a network, where the user system receives a query from a user and transmits the query and the unique user identifier over the network;
a server, in communication with the network, that receives the query and the unique user identifier, associates a unique query identifier with the query, stores the query, the unique query identifier and the unique user identifier in a database, and transmits a notification of the query to a searcher in an order based on a rank of the searcher for a keyword of the query; and
a searcher system, in communication with the network, that communicates the query to the searcher when determining that the searcher has accepted the notification and generates a search result for the query based on input from the searcher, and
where a real-time communication is executed between the searcher and the user including during a search of the query and an indicator of the search result generated by the searcher system is provided to the user,
the server receives a request from the user subsequent to the real-time communication,
the user system is provided with an automated result in response to the request,
the searcher is selected to perform a search responsive to the request when the user activates the indicator of the search result and rejects the automated result provided responsive to the request,
a rank of the searcher associated with content of the request increases when the user activates the indicator of the search result, and
an anonymous communication is conducted between the searcher and the user using the unique query identifier of the query to establish a follow-up session that is subsequent to the real-time communication.

21. A system for facilitating information exchange between a user sending a request for information and a searcher providing a response containing the information via a network, the system comprising:
an interface coupled to the network;
a database including:
a first table for mapping a unique user identifier to the user;
a second table for mapping a unique searcher identifier to the searcher;
a third table for mapping a unique query identifier to requests;
a request processor in communication with the interface and the database that receives the request from the user, adds a record to the first table identifying the user, adds a record to the second table identifying the searcher, adds a record to the third table identifying the request, and forwards information of the request and the user to the searcher via the interface while maintaining the user's anonymity; and
a response processor in communication with the interface and the database that receives the response from the searcher via the interface, records a unique identifier of a search result of the searcher, determines the unique identifier of the user from the database, and forwards an indicator of the search result of the searcher in receipt of the request to the user while maintaining the searcher's anonymity, and
where the indicator of the search result is provided to the user and the user adjusts a ranking of the searcher and the searcher is selected to perform a search responsive to a query of the user when a stored answer provided responsive to the query is rejected by the user and the indicator of the search result is activated by the user, and
an anonymous communication is conducted between the searcher and the user using the unique query identifier of the request when determining that the searcher is ranked highest for the request.

22. The system of claim 21, wherein the database further comprises a fourth table for mapping a unique keyword identifier to the unique user identifier and the unique searcher identifier and the ranking of the searcher for the request is based on a keyword of the query and a ranking of the keyword for the request and the searcher is notified of the request in an order based on the rankinq of the searcher for the request.

23. A computer readable storage medium having a program embodied therein for causing a computer to execute operations including assisting a user submitting a first query to a human searcher, comprising:
 assigning a unique identifier to the human searcher;
 receiving the first query from the user during a first communication session;
 assigning a unique identifier to the user;
 assigning a unique identifier to the first query;
 associating the unique identifier of the user with the unique identifier of the first query in a database;
 presenting an indicator of a search result of the human searcher in receipt of the first query to the user during an initial session;
 receiving a second query from the user subsequent to the initial session and providing a stored answer to the user in response to the second query;
 selecting the searcher to perform a search responsive to the second query when determining that an automated result provided responsive to the second query is rejected by the user and that the user has designated the searcher as a preferred searcher by selecting the indicator of the search result of the human searcher in receipt of the first query; and
 providing search results during a second communication session subsequent to the first communication session using the unique identifier of the first query.

24. A computer-readable storage medium having recorded thereon a computer program product for use with a web server computer, and causing a computer to execute operations including to assist a user submitting a query to a human searcher, comprising:
 assigning a unique identifier to the human searcher;
 receiving the query from the user during a first communication session;
 assigning a unique identifier to the user;
 assigning a unique identifier to the query;
 associating the unique identifier of the user with the unique identifier of the query in a database;
 presenting the query to the searcher to perform a search responsive to the query and produce a search result during the first communication session;
 receiving the search result from the searcher during the first communication session;
 associating the unique identifier of the searcher and a unique identifier of the search result with the unique identifier of the first query in the database; and
 presenting the search result to the user during the first communication session, and
 where an indicator of the search result of the searcher presented with the query is provided to the user, and the searcher is selected to perform a search responsive to a request of the user in an order based on an adjusted ranking of the searcher for a keyword when a stored result provided responsive to the request is rejected by the user and the user activates the indicator of the search result and an anonymous communication is conducted between the searcher and the user using the unique identifier of the query.

25. The computer-readable storage medium of claim 24, comprising:
 associating the unique identifier of the searcher with the unique identifier of the user in the database during the first communication session,
 retrieving the unique identifier of the user from a device associated with the user during a second communication session,
 reading the unique identifier of the searcher from the database based on the association between the unique identifier of the user and the unique identifier of the searcher; and
 establishing an anonymous communication channel between the user and the searcher when determining that the searcher has modified the search result and that the user has requested to be informed of the modification.

26. A method of establishing a communication, comprising:
 storing previous queries and responses to the previous queries, each of the queries and responses being assigned a randomly-generated ID based on content of the queries and the responses;
 assigning a random ID to correspond to a user submitting a query and to a human searcher generating a response to the query;
 correlating the query to the random ID corresponding to the user and to the random ID corresponding to the human searcher receiving the query and generating the response;
 displaying said stored previous queries and responses, said displaying including providing access to the previous queries to the user;
 directing a request submitted by the user and a communication history of the user to the human searcher in accordance with said correlating;
 locating the human searcher in response to the request from the user based on said correlating when a stored response provided responsive to the request is rejected by the user and an indicator of the response is activated by the user;
 adjusting a rank of the human searcher for a keyword of the request based on the activating; and
 conducting an anonymous communication between the searcher and the user using an identifier of the query when determining that the human searcher is ranked highest for the keyword.

27. A system, comprising:
 a user device; and
 a search system coupled to the user device and assigning an identifier to a human searcher in receipt of a first query from a user, associating an identifier assigned to the user and the identifier assigned to the human searcher with a unique identifier of the first query, providing an indicator of a search result of the human searcher in receipt of the first query to the user during an initial session, receiving a second query from the user subsequent to the initial session and providing a stored answer to the user in response to the second query, selecting the searcher to perform a search responsive to the second query when the user activates the indicator of the search result and rejects the stored answer provided responsive to the second query, and
 conducting an anonymous communication between the searcher and the user using the identifier of the first query to establish a follow-up session that is subsequent to the initial session.

28. The system of claim 27, wherein one of an IP address assigned to the user device, respective identifiers assigned to the user and the searcher in a previous search session and the identifier of the previous search query is used for reestablishing the previous search session with the user.

29. The system of claim 27, wherein a second searcher uses stored responses of previously answered queries associated with the searcher to return a response when a previous search session is reestablished.

30. A computer readable storage medium for controlling a computer, comprising:
- storing, in a query database, a query, an identifier of the query, a user identifier, a searcher identifier indicating a searcher in receipt of the query, and an identifier of a search result of the searcher in receipt of the query,
- providing a programmatic response to a request associated with the user identifier;
- selecting the searcher associated with the searcher identifier to perform a search for the request when determining that the programmatic response is not accepted by the user and that the user has selected an indicator of the search result associated with the searcher in receipt of the query and that the searcher is associated with a keyword of the request and that the searcher is a first searcher to respond to a notification of the request;
- delivering the notification of the request to the searcher in an order based on a rank of the searcher associated with content of the request including the keyword, increasing the rank of the searcher associated with the content when the user activates the identifier of the search result, and
- establishing an anonymous communication between the searcher and the user for the request using the identifier of the query.

31. A computer readable storage medium for controlling a computer, comprising:
- storing a query ID, a user ID, a searcher ID and a search result ID;
- assigning an identifier to a human searcher in receipt of a query from a user;
- associating an identifier assigned to the user and the identifier assigned to the human searcher and an identifier assigned to a human guide with an identifier of the query; and
- providing an indicator of a search result of the query to the user responsive to a request of the user and establishing an anonymous communication between the user and the human searcher and the human guide responsive to selection of the indicator of the search result of the query by the user.

32. A display, comprising:
- a query window for submitting a request; and
- a stored query window displaying a previously searched query including an option for reestablishing a communication with a searcher who received said previously searched query by activating an indicator of a search result of the searcher for the previously searched query, and
- where a user submits the request and the user is provided with a stored search result,
- the searcher is selected to perform a search responsive to the request when determining that the stored search result is rejected by the user and that the user has activated the indicator of the search result of the searcher for the previously searched query, and
- an anonymous communication is conducted between the searcher and the user using an identifier associated with the previously searched query.

* * * * *